(12) United States Patent
Zhao et al.

(10) Patent No.: US 12,244,375 B2
(45) Date of Patent: Mar. 4, 2025

(54) BEAMFORMING-BASED COMMUNICATION METHOD AND NETWORK DEVICE

(71) Applicant: HUAWEI TECHNOLOGIES CO., LTD., Shenzhen (CN)

(72) Inventors: Wei Zhao, Dongguan (CN); Guohua Yu, Shanghai (CN); Guanqun Liu, Shenzhen (CN); Daowei Wang, Shanghai (CN); Bo Xie, Dongguan (CN); Baomin Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 314 days.

(21) Appl. No.: 17/720,544

(22) Filed: Apr. 14, 2022

(65) Prior Publication Data

US 2022/0239354 A1 Jul. 28, 2022

Related U.S. Application Data

(63) Continuation of application No. PCT/CN2020/121063, filed on Oct. 15, 2020.

(30) Foreign Application Priority Data

Oct. 16, 2019 (CN) .......................... 201910983536.2

(51) Int. Cl.
*H04B 7/06* (2006.01)
*H04W 48/10* (2009.01)
(Continued)

(52) U.S. Cl.
CPC ........... *H04B 7/0617* (2013.01); *H04B 7/063* (2013.01); *H04W 48/10* (2013.01); *H04W 48/16* (2013.01); *H04W 56/0015* (2013.01)

(58) Field of Classification Search
CPC ..... H04B 7/0617; H04B 7/063; H04W 48/10; H04W 48/16
See application file for complete search history.

(56) References Cited

U.S. PATENT DOCUMENTS

2016/0329943 A1* 11/2016 Selén .................... H04B 7/0408
2019/0297598 A1    9/2019 Li et al.
(Continued)

FOREIGN PATENT DOCUMENTS

CN    106851712 A    6/2017
CN    108633089 A    10/2018
(Continued)

OTHER PUBLICATIONS

Huawei, HiSilicon, "UL/DL BM for overhead reduction". 3GPP TSG RAN WG1 Meeting #97, Reno, USA, May 13-17, 2019, R1-1907552, 5 pages.
(Continued)

*Primary Examiner* — David B Lugo
(74) *Attorney, Agent, or Firm* — Maier & Maier, PLLC

(57) ABSTRACT

A beamforming-based communication method includes: obtaining cell information; when the cell information meets a preset low-load condition, dividing to-be-processed broadcast messages into a plurality of broadcast message groups; determining, based on a preset correspondence between a broadcast message and a broadcast beam, a broadcast beam group corresponding to each broadcast message group and a broadcast beam for sending no broadcast message in each time window; sending the broadcast message group in each time window by using the broadcast beam group; and shutting down, in each time window, the broadcast beam for sending no broadcast message. Some broadcast beams are (Continued)

used in each time window to send the broadcast message, and the broadcast beam for sending no broadcast message is shut down.

12 Claims, 9 Drawing Sheets

(51) Int. Cl.
*H04W 48/16* (2009.01)
*H04W 56/00* (2009.01)

(56) References Cited

U.S. PATENT DOCUMENTS

2019/0349099 A1* 11/2019 Scheck ................. H04W 24/10
2022/0345269 A1* 10/2022 Alriksson ......... H04W 56/0015

FOREIGN PATENT DOCUMENTS

WO   2016198909 A1   12/2016
WO   2018064407 A1   4/2018

OTHER PUBLICATIONS

3GPP TS 38.331 V15.7.0 (Sep. 2019), "3rd Generation Partnership Project; Technical Specification Group Radio Access Network; NR; Radio Resource Control (RRC) protocol specification(Release 15)", 527 pages.
Huawei, HiSilicon, "Enhancements on multi-beam operation". 3GPP TSG RAN WG1 Meeting #97, Reno, USA, May 13-17, 2019, R1-1906030, 10 pages.
ZTE, ZTE Microelectronics, "Further discussion on Minimum Si". 3GPP TSG-RAN WG2 NR Ad Hoc, Spokane, USA, Jan. 17-19, 2017, R2-1700147, 8 pages.
CATT, "Delivery of Other System Information". 3GPP TSG RAN WG1 NR Ad-Hoc#2, Qingdao, P.R.China, Jun. 27-30, 2017, R1-1710030, 3 pages.

* cited by examiner

BEAMFORMING-BASED COMMUNICATION METHOD AND NETWORK DEVICE

CROSS-REFERENCE TO RELATED APPLICATIONS

This application is a continuation of International Application No. PCT/CN2020/121063, filed on Oct. 15, 2020, which claims priority to Chinese Patent Application No. 201910983536.2, filed on Oct. 16, 2019. The disclosures of the aforementioned applications are incorporated herein by reference in these entireties.

TECHNICAL FIELD

The embodiments relate to the field of wireless communication, and in particular, to a beamforming-based communication method and a network device.

BACKGROUND

A 5th generation (5G) mobile communication technology is a latest cellular mobile communication technology. 5G performance objectives include a high rate, a low latency, and the like.

In a beamforming-based communication method, a base station configures a plurality of broadcast beams in fixed directions. The base station sends a broadcast message through beam sweeping. A terminal measures the plurality of broadcast beams to obtain an optimal beam, and then completes synchronization and demodulation of system information based on the optimal beam.

During actual application, some base stations are often in a low-load state or a no-load state. In this case, the base station consumes a large amount of electric energy to perform beam sweeping and can be accessed by only a few terminals. Therefore, it is necessary to improve the communication method performed by the base station, to reduce energy consumption of the base station.

SUMMARY

A beamforming-based communication method may reduce invalid broadcast beams and reduce a waste of resources.

According to a first aspect a beamforming-based communication method includes: after obtaining cell information, when the cell information meets a preset low-load condition, dividing, based on the cell information, to-be-processed broadcast messages into a plurality of broadcast message groups; determining, based on a preset correspondence between a broadcast message and a broadcast beam, a broadcast beam group corresponding to each broadcast message group and a broadcast beam for sending no broadcast message in each time window; sending the broadcast message group in each time window by using the broadcast beam group; and shutting down, in each time window, the broadcast beam for sending no broadcast message.

The cell information may include but is not limited to downlink resource utilization and/or a quantity of access users, where the quantity of access users is a quantity of users who have established a communication connection with a network device in a cell. The to-be-processed broadcast messages are all broadcast messages to be sent in a time window, each broadcast message group corresponds to one time window, and a length of each time window is equal to a synchronization signal sending periodicity. Shutting down the broadcast beam means that the network device shuts down, in a target slot in which no broadcast message is transmitted, a bias voltage of a power amplifier corresponding to the target slot, to achieve an objective of sending no broadcast beam. The target slot is a slot that is configured to be allowed to transmit the broadcast message. The broadcast beam group is one or more beams used to send the broadcast message in the time window.

When the cell information meets the preset low-load condition, the network device divides the to-be-processed broadcast messages into the plurality of broadcast message groups. When the cell information does not meet the preset low-load condition, it indicates that the cell is not in a low-load state or a no-load state. In this way, the network device may send all broadcast messages in one time window, and there is no need to perform the step of dividing, based on the cell information, the to-be-processed broadcast messages into the plurality of broadcast message groups.

In this implementation, when the cell information meets the preset low-load condition, all broadcast messages that are originally sent in one time window are divided into a plurality of broadcast message groups, and then the plurality of broadcast message groups are sent in a plurality of time windows. In this way, some broadcast beams are used in each time window to send the broadcast message. Shutting down the broadcast beam for sending no broadcast message may also be understood as shutting down a bias voltage of a power amplifier corresponding to the broadcast beam for sending no broadcast message. In this way, power amplifiers working in each time window can be reduced, to reduce energy consumption of the network device.

In a possible implementation, the cell information is the downlink resource utilization; and when the downlink resource utilization is less than a first preset threshold, it is determined that the cell information meets the preset low-load condition. The first preset threshold may be a ratio of a total quantity of slots occupied by the to-be-processed broadcast messages in the time window to a total quantity of downlink slots, or a value that is set based on actual application. In this way, a method for determining whether the cell is in the low-load state is provided.

Optionally, the dividing, based on the cell information, to-be-processed broadcast messages into a plurality of broadcast message groups includes: when the downlink resource utilization is less than the first preset threshold and the downlink resource utilization is greater than or equal to a second preset threshold, dividing the to-be-processed broadcast messages into a first quantity of broadcast message groups; and when the downlink resource utilization is less than the second preset threshold, dividing the to-be-processed broadcast messages into a second quantity of broadcast message groups. Both the first quantity and the second quantity are positive integers greater than 1, the first quantity is less than the second quantity, and the second quantity is less than or equal to a total quantity of broadcast beams configured for the cell. In this implementation, higher downlink resource utilization indicates a smaller quantity of broadcast beam groups used to send the broadcast message groups, and a larger quantity of broadcast beams in each broadcast beam group indicates fewer broadcast beams that can be shut down in each time window. Otherwise, more broadcast beams can be shut down in each time window. Therefore, a method for flexibly adjusting a quantity of broadcast message groups based on the downlink resource utilization can not only meet a differentiated requirement for a communication resource, but also can better reduce energy consumption.

In another possible implementation, the cell information is the quantity of access users; and when the quantity of access users is less than a first preset user quantity, it is determined that the cell information meets the preset low-load condition. In this way, another method for determining whether the cell is in the low-load state is provided.

Optionally, the dividing, based on the cell information, to-be-processed broadcast messages into a plurality of broadcast message groups includes: when the quantity of access users is less than the first preset user quantity and the quantity of access users is greater than or equal to a second preset user quantity, dividing the to-be-processed broadcast messages into a third quantity of broadcast message groups; and when the quantity of access users is less than the second preset user quantity, dividing the to-be-processed broadcast messages into a fourth quantity of broadcast message groups. Both the third quantity and the fourth quantity are positive integers greater than 1, the third quantity is less than the fourth quantity, and the fourth quantity is less than or equal to a total quantity of broadcast beams configured for the cell.

In this implementation, a larger quantity of access users indicates a smaller quantity of broadcast beam groups used to send the broadcast message groups, and a larger quantity of broadcast beams in each broadcast beam group indicates fewer broadcast beams that can be shut down in each time window. Otherwise, more broadcast beams can be shut down in each time window. Therefore, a method for flexibly adjusting a quantity of broadcast message groups based on the quantity of access users is provided, to meet a differentiated requirement for a communication resource and better reduce energy consumption.

In another possible implementation, the cell information includes the downlink resource utilization and the quantity of access users; and when the downlink resource utilization is less than a first preset threshold and the quantity of access users is less than a first preset user quantity, it is determined that the cell information meets the preset low-load condition. In this way, another method for determining whether the cell is in the low-load state is provided.

Optionally, the dividing, based on the cell information, to-be-processed broadcast messages into a plurality of broadcast message groups includes: when the downlink resource utilization falls within a first downlink resource utilization range and the quantity of access users falls within a first user quantity range, dividing the to-be-processed broadcast messages into a fifth quantity of broadcast message groups; and when the downlink resource utilization falls within a second downlink resource utilization range and the quantity of access users falls within a second user quantity range, dividing the to-be-processed broadcast messages into a sixth quantity of broadcast message groups. Both the fifth quantity and the sixth quantity are positive integers greater than 1, the fifth quantity is less than the sixth quantity, and the sixth quantity is less than or equal to a total quantity of broadcast beams configured for the cell.

In this implementation, higher downlink resource utilization and a larger quantity of access users indicate a smaller quantity of broadcast beam groups used to send the broadcast message groups, and a larger quantity of broadcast beams in each broadcast beam group indicates fewer broadcast beams that can be shut down in each time window. Otherwise, more broadcast beams can be shut down in each time window. Therefore, a method for flexibly adjusting a quantity of broadcast message groups based on the downlink resource utilization and the quantity of access users is provided, to meet a differentiated requirement for a communication resource and better reduce energy consumption.

In any one of the first aspect or the possible implementations of the first aspect, the broadcast message includes at least one of a synchronization signal block, a SIB1 message, OSI, or a paging message.

According to a second aspect, a beamforming-based communication method includes: after obtaining cell information, when the cell information meets a preset low-load condition, prolonging, based on the cell information, a sending periodicity of a broadcast message; and sending the broadcast message based on the prolonged sending periodicity. Compared with sending the broadcast message based on preset duration, sending the broadcast message based on the prolonged sending periodicity only requires a smaller quantity of sending times of the broadcast message. In this way, fewer broadcast beams need to be used, thereby reducing energy consumption of a network device.

In a possible implementation, the cell information is downlink resource utilization; and when the downlink resource utilization is less than a first preset threshold, it is determined that the cell information meets the preset low-load condition. In this way, a method for determining whether a cell is in a low-load state is provided.

Optionally, the prolonging, based on the cell information, a sending periodicity of a broadcast message includes: when the downlink resource utilization is less than the first preset threshold and the downlink resource utilization is greater than or equal to a second preset threshold, adjusting the sending periodicity of the broadcast message from the preset duration to first duration; and when the downlink resource utilization is less than the second preset threshold, adjusting the sending periodicity of the broadcast message from the preset duration to second duration. The second duration is greater than the first duration, and the first duration is greater than the preset duration. In this implementation, there is a negative correlation between the downlink resource utilization and the sending periodicity of the broadcast message. Lower downlink resource utilization indicates a longer sending periodicity of the broadcast message and fewer broadcast beams for sending the broadcast message in each periodicity. In this way, working power amplifiers can be reduced, to reduce more energy consumption. Therefore, a method for flexibly adjusting the sending periodicity of the broadcast message based on the downlink resource utilization is provided, to meet a differentiated requirement for a communication resource and better reduce energy consumption.

In a possible implementation, the cell information is a quantity of access users; and when the quantity of access users is less than a first preset user quantity, it is determined that the cell information meets the preset low-load condition. In this way, another method for determining whether the cell is in a low-load state is provided.

Optionally, the prolonging, based on the cell information, a sending periodicity of a broadcast message includes: when the quantity of access users is less than the first preset user quantity and the quantity of access users is greater than or equal to a second preset user quantity, adjusting the sending periodicity of the broadcast message from the preset duration to third duration; and when the quantity of access users is less than the second preset user quantity, adjusting the sending periodicity of the broadcast message from the preset duration to fourth duration. The fourth duration is greater than the third duration, and the third duration is greater than the preset duration. It can be understood that there is a negative correlation between the quantity of access users and the sending periodicity of the broadcast message. A smaller quantity of access users indicates a longer sending periodicity of the broadcast message and fewer broadcast beams for sending the broadcast message in each periodicity. In this way, working power amplifiers can be reduced, to reduce more energy consumption. Therefore, a method for flexibly adjusting the sending periodicity of the broadcast message based on the quantity of access users is provided, to meet a differentiated requirement for a communication resource and better reduce energy consumption.

In another possible implementation, the cell information includes downlink resource utilization and a quantity of access users; and when the downlink resource utilization is less than a first preset threshold and the quantity of access users is less than a first preset user quantity, it is determined that the cell information meets the preset low-load condition. In this way, another method for determining whether the cell is in a low-load state is provided.

Optionally, the prolonging, based on the cell information, a sending periodicity of a broadcast message includes: when the downlink resource utilization falls within a first downlink resource utilization range and the quantity of access users falls within a first user quantity range, adjusting the sending periodicity of the broadcast message from the preset duration to fifth duration; and when the downlink resource utilization falls within a second downlink resource utilization range and the quantity of access users falls within a second user quantity range, adjusting the sending periodicity of the broadcast message from the preset duration to sixth duration. The sixth duration is greater than the fifth duration, and the fifth duration is greater than the preset duration. The first downlink resource utilization range is a range that is less than the first preset threshold and not less than a second preset threshold, and the first user quantity range is a range that is less than the first preset user quantity and not less than a second preset user quantity. The second downlink resource utilization range is a range that is less than the second preset threshold, and the second user quantity range is a range that is less than the second preset user quantity. Therefore, a method for flexibly adjusting the sending periodicity of the broadcast message based on the downlink resource utilization and the quantity of access users is provided, to meet a differentiated requirement for a communication resource and better reduce energy consumption.

In any one of the second aspect or the possible implementations of the second aspect, the broadcast message includes at least one of a synchronization signal block, a system information block type 1 SIB1 message, other system information OSI, or a paging message.

According to a third aspect, a beamforming-based communication method includes: after receiving, in an on-demand broadcast mode, a broadcast other system information OSI request initiated by a terminal, sending OSI to the terminal based on the broadcast OSI request; when a quantity of periodicities during which broadcast OSI requests sent by the terminal are continuously received in a monitoring window is greater than or equal to a first preset periodicity quantity, adjusting a mode for broadcasting the OSI from the on-demand broadcast mode to a periodic broadcast mode; and periodically broadcasting the OSI in the periodic broadcast mode. In this implementation, in a heavy traffic scenario, UE does not need to send an OSI request to a network device and can directly obtain OSI by periodically monitoring the OSI. Therefore, the network device does not need to receive and process OSI requests of a large quantity of UEs, thereby reducing resource overheads of the OSI requests.

In a possible implementation, when a quantity of periodicities for broadcasting the OSI is greater than or equal to a second preset periodicity quantity, the mode for broadcasting the OSI is adjusted from the periodic broadcast mode to the on-demand broadcast mode.

According to a fourth aspect, a network device has a function of implementing the beamforming-based communication method in the first aspect. The function may be implemented by hardware or may be implemented by hardware executing corresponding software. The hardware or the software includes one or more modules corresponding to the foregoing function.

According to a fifth aspect, a network device has a function of implementing the beamforming-based communication method in the second aspect. The function may be implemented by hardware or may be implemented by hardware executing corresponding software. The hardware or the software includes one or more modules corresponding to the foregoing function.

According to a sixth aspect, a network device has a function of implementing the beamforming-based communication method in the third aspect. The function may be implemented by hardware or may be implemented by hardware executing corresponding software. The hardware or the software includes one or more modules corresponding to the foregoing function.

According to a seventh aspect, a computer-readable storage medium stores instructions. When the instructions are run on a computer, the computer is enabled to perform the methods in the foregoing aspects.

According to an eighth aspect, a computer program product includes instructions. When the computer program product runs on a computer, the computer is enabled to perform the methods in the foregoing aspects.

According to a ninth aspect, a communication apparatus may include an entity such as a terminal device or a chip. The communication apparatus includes a processor and a memory. The memory is configured to store instructions, and the processor is configured to execute the instructions in the memory, to enable the communication apparatus to perform the method according to any one of the first aspect, second aspect, or the third aspect.

According to a tenth aspect, a chip system includes a processor, configured to support a corresponding device in implementing a function in the foregoing aspects, for example, sending or processing data and/or information in the foregoing method. In a possible implementation, the chip system further includes a memory. The memory is configured to store program instructions and data that are necessary for the corresponding device. The chip system may include a chip or may include a chip and another discrete component.

DETAILED DESCRIPTION OF THE EMBODIMENTS

A beamforming-based communication method may be applied to a 5G communication system in standalone (SA) networking.

Figure 1:
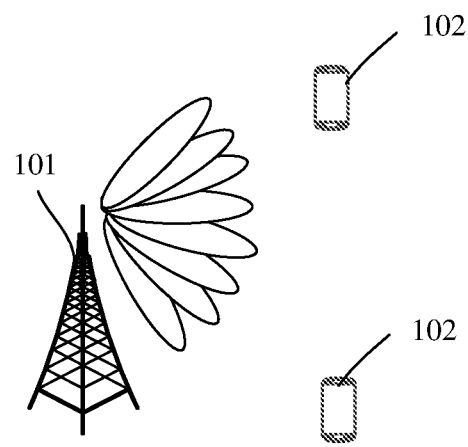
FIG. 1 is a schematic diagram of an application scenario.

As shown in FIG. 1, a cell in the 5G communication system includes at least one network device 101 and at least one terminal 102.

The network device 101 is a network side device that performs wireless communication with the terminal 102, for example, a base station (gNB), a micro base station, an access point, or a transmission reception point (TRP) in the 5G communication system.

The terminal 102 is a terminal in a 5G network, and is also referred to as an access terminal, a subscriber unit, a subscriber station, a mobile station, a remote terminal, a mobile device, a user terminal, a terminal device, a wireless communication device, or a user apparatus. The terminal 102 may be a cellular phone, a handheld device having a wireless communication function, a computing device, a vehicle-mounted device, a wearable device, or the like.

The network device 101 is configured with beams in N directions, and a beam that can be used to send a broadcast message is referred to as a broadcast beam. The network device 101 sequentially transmits wireless signals by using beams in different directions, to complete beam coverage for the cell. A process in which the network device 101 sequentially transmits the wireless signals by using the beams in different directions is also referred to as beam sweeping.

As shown in FIG. 1, the network device 101 uses eight beams to cover the cell served by the network device 101. The network device 101 sends the broadcast message through beam sweeping. After measuring broadcast messages that are transmitted by using different beams, the terminal 102 sends a beam measurement report to the network device 101; and the network device 101 determines an optimal beam based on the beam measurement report, and the terminal 102 completes synchronization and demodulation of system information based on the optimal beam.

The broadcast message includes but is not limited to one or more of a synchronization signal block (SSB), a system information block type 1 (SIB1), other system information (OSI), and a paging message.

A synchronization signal (SS) is a signal that provides a same time reference for a device that needs to synchronously process information. The synchronization signal may include a primary synchronization signal (PSS) and a secondary synchronization signal (SSS).

An SSB is a resource block including one PSS symbol, one SSS, and two or more physical broadcast channel (PBCH) symbols in new radio (NR). A PSS symbol, an SSS symbol, and a PBCH symbol may be orthogonal frequency division multiplexing (OFDM) symbols, and one PSS, SSS, or PBCH resource block may include one or more OFDM symbols. Positions of the PSS symbol, the SSS symbol, and the PBCH symbol in the synchronization signal block may be adjacent. A plurality of synchronization signal blocks forms a synchronization signal burst (SS burst), and a plurality of synchronization signal bursts forms a synchronization signal burst set (SS burst set).

A sending periodicity of the SSB may be 20 milliseconds (ms), 40 ms, 80 ms, or 160 ms. Usually, a periodicity for searching the SSB in an initial cell is set to 20 ms, and transmission is completed within 5 ms.

The SIB1 carries information related to cell access and cell selection. The SIB1 is sent through a downlink shared channel (DL-SCH). A sending periodicity of the SIB1 may be within 160 ms, and periodicity duration may be adjusted by the network device. The SIB1 is also referred to as a SIB1 message.

The OSI is sent through a physical downlink shared channel (PDSCH). The OSI includes a SIB2 to a SIBn.

The paging message may also be denoted as Paging (Pg).

Figure 2:
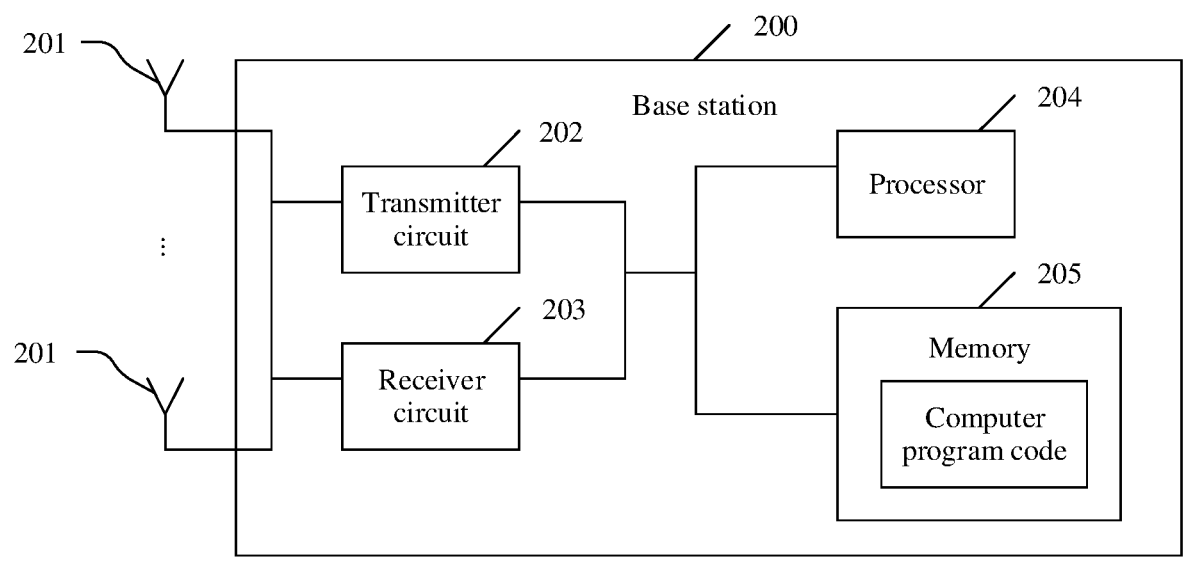
FIG. 2 is a schematic diagram of a structure of a base station.

An example in which the network device 101 is a base station is used below. FIG. 2 shows an embodiment of the base station. In this embodiment, the base station 200 includes an antenna 201, a transmitter circuit 202, a receiver circuit 203, a processor 204, and a memory 205.

The base station 200 includes a plurality of antennas 201, and the plurality of antennas 201 form an antenna array. There may be one or more transmitter circuits 202, receiver circuits 203, processors 204, and memories 205.

The processor 204 controls an operation of the base station 200.

The memory 205 may include a read-only memory and a random access memory and provides instructions and data for the processor 204. The memory 205 may store computer program code. A part of the memory 205 may further include a non-volatile random access memory.

In addition, a carrier for accommodating the transmitter circuit 202 and the receiver circuit 203 may be included, to allow data transmission and receiving between the base station 200 and a remote position. The transmitter circuit 202 and the receiver circuit 203 may be coupled to the antenna 201. Components of the base station 200 are coupled together by using a bus system. In addition to a data bus, the bus system further includes a power bus, a control bus, and a status signal bus.

A method in the embodiments may be applied to the processor 204 or may be implemented by the processor 204. The processor 204 includes an integrated circuit chip and has a signal processing capability.

In an implementation process, steps in the following method may be implemented by using a hardware integrated logic circuit in the processor 204, or by using instructions in a form of software. The instructions may be implemented and controlled by cooperating with the processor 204 and are used to perform the method in the embodiments. The processor 204 may be a general-purpose processor, a digital signal processor, an application-specific integrated circuit, a field programmable gate array or another programmable logic device, a discrete gate or a transistor logic device, or a discrete hardware component. The processor may implement or perform methods, steps, and logical block diagrams in the embodiments. The general-purpose processor may be a microprocessor, or the processor may be any conventional processor, decoder, or the like. The steps in the method with reference to the embodiments may be directly performed and completed by a hardware decoding processor or may be performed and completed by using a combination of hardware and software modules in a decoding processor. The software module may be located in a mature storage medium in the art, such as a random access memory, a flash memory, a read-only memory, a programmable read-only memory, an electrically erasable programmable memory, or a register.

In a current 5G communication method, a network device sends a broadcast message in each synchronization signal sending periodicity, for access by a terminal. In a scenario with a small quantity of users, continuously sending broadcast messages causes more energy consumption of the network device. For this problem, all broadcast messages sent in one time window are divided into a plurality of broadcast message groups, and then one broadcast message group is sent in each time window, the plurality of broadcast message groups are sent in a plurality of time windows, and a broadcast beam for sending no broadcast message is shut down in each time window. This reduces beams that need to be generated by the network device and reduces energy consumption of the network device in a broadcast process.

Figure 3:
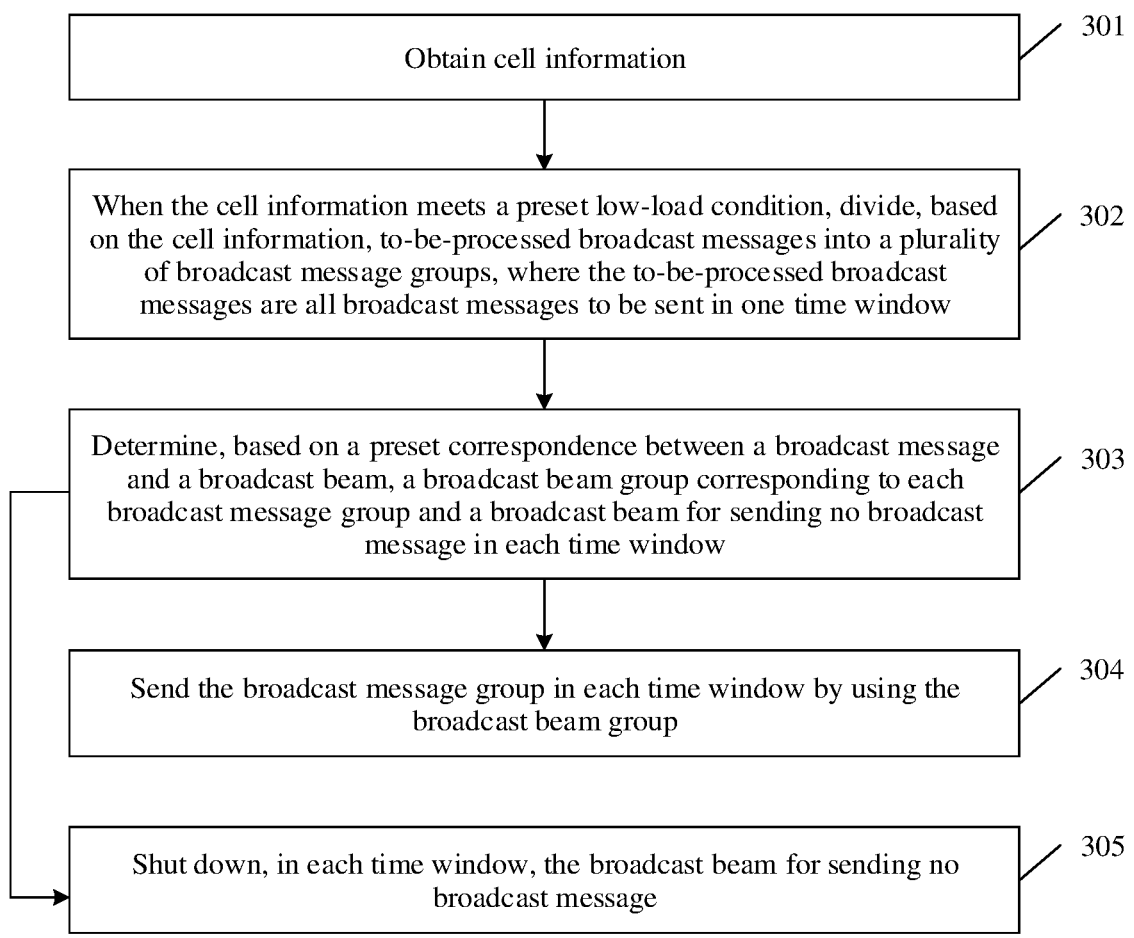
FIG. 3 is a flowchart of a beamforming-based communication method.

As shown in FIG. 3, an embodiment of a beamforming-based communication method provided includes the following steps.

Step 301. Obtain cell information.

In this embodiment, the cell information includes downlink resource utilization and/or a quantity of access users.

Step 302. When the cell information meets a preset low-load condition, divide, based on the cell information, to-be-processed broadcast messages into a plurality of broadcast message groups.

When the downlink resource utilization is less than a first preset threshold, the quantity of access users is less than a first preset user quantity, or both the foregoing conditions are met, it may be determined that the cell information meets the preset low-load condition. If the cell information meets the preset low-load condition, it indicates that a cell network is in a low-load state or a no-load state; and if the cell information does not meet the preset low-load condition, it indicates that the cell network is in a high-load state or a normal-load state.

The first preset threshold may be a ratio of a total quantity of slots occupied by the to-be-processed broadcast messages in a time window to a total quantity of downlink slots, or a value that is set based on actual application. The value is not limited. A specific value of the first preset user quantity may be set based on a quantity of communication users during actual application, and this is not limited.

The to-be-processed broadcast messages are all broadcast messages to be sent in one time window. Each broadcast message group includes one or more broadcast messages, and broadcast messages in different broadcast message groups correspond to different slots. The broadcast message includes at least one of a synchronization signal block, a SIB1 message, OSI, or a paging message. Each broadcast message group corresponds to one time window, and a length of each time window is equal to a synchronization signal sending periodicity. It should be noted that a plurality of time windows corresponding to the plurality of broadcast message groups may be consecutive.

Step 303. Determine, based on a preset correspondence between a broadcast message and a broadcast beam, a broadcast beam group corresponding to each broadcast message group and a broadcast beam for sending no broadcast message in each time window.

In one time window, the broadcast beam group includes one or more broadcast beams. In each time window, a broadcast beam used to send the broadcast message and the broadcast beam for sending no broadcast message in the time window may be determined. In the preset correspondence, for each time window, a number of a slot occupied by each broadcast message may be set based on a protocol. For details, refer to the following optional embodiments.

Step 304. Send the broadcast message group in each time window by using the broadcast beam group.

One broadcast message may be sent in one slot by using each broadcast beam. It may be understood that different broadcast beams are sent in different time windows, so that a terminal can measure all broadcast beams in the plurality of time windows and then obtain an optimal beam based on a beam measurement report.

Step 305. Shut down, in each time window, the broadcast beam for sending no broadcast message.

After determining the broadcast beam for sending no broadcast message, a network device shuts down the broadcast beam for sending no broadcast message. Shutting down the broadcast beam may be understood as shutting down a bias voltage of a power amplifier corresponding to the broadcast beam for sending no broadcast message. All or some of broadcast beams for sending no broadcast message can be shut down.

It should be noted that there is no fixed sequence between step 304 and step 305. In a time window, a broadcast beam for sending no broadcast message may be shut down before the broadcast message group is sent by using the broadcast beam group.

In this embodiment, when the cell is in the low-load state or the no-load state, some broadcast beams are sent in each time window for access by users, and other broadcast beams are shut down. In this way, power amplifiers working in each time window can be reduced in a broadcast process, to reduce energy consumption of the network device.

The cell information may be the downlink resource utilization and/or the quantity of access users. Based on the foregoing cell information, the to-be-processed broadcast messages may be divided, based on the cell information, into the plurality of broadcast message groups in a plurality of manners. The following provides detailed descriptions.

In an optional embodiment, the cell information is the downlink resource utilization.

When the downlink resource utilization is less than the first preset threshold and the downlink resource utilization is greater than or equal to a second preset threshold, the to-be-processed broadcast messages are divided into a first quantity of broadcast message groups; and when the downlink resource utilization is less than the second preset threshold, the to-be-processed broadcast messages are divided into a second quantity of broadcast message groups. Both the first quantity and the second quantity are positive integers greater than 1, the first quantity is less than the second quantity, and the second quantity is less than or equal to a total quantity of broadcast beams configured for the cell.

In this embodiment, when the downlink resource utilization is greater than or equal to the first preset threshold, it is determined that the cell information does not meet the preset low-load condition. When the downlink resource utilization is less than the first preset threshold, it is determined that the cell information meets the preset low-load condition.

The network device presets two downlink resource utilization ranges. A first downlink resource utilization range is [the second preset threshold, the first preset threshold), and a second downlink resource utilization range is [0, the second preset threshold). When the downlink resource utilization falls within the first downlink resource utilization range, the to-be-processed broadcast messages are divided into N1 broadcast message groups. When the obtained downlink resource utilization falls within the second downlink resource utilization range, the to-be-processed broadcast messages may be divided into N2 broadcast message groups. N1 is the first quantity, and N2 is the second quantity. N2 is greater than N1, that is, there is a negative correlation between the downlink resource utilization and a quantity of broadcast message groups.

When the downlink resource utilization falls within the second downlink resource utilization range, it indicates that the downlink resource utilization of the cell is at the lowest level. In this case, very few cell resources are occupied. If the to-be-processed broadcast messages are divided into the N1 broadcast message groups, resources are wasted. Compared with a case in which the to-be-processed broadcast messages are divided into the N1 broadcast message groups, after the to-be-processed broadcast messages are divided into the N2 broadcast message groups, each broadcast message group includes fewer broadcast messages, that is, fewer broadcast beams need to be transmitted in each time window, and more broadcast beams can be shut down, thereby reducing a waste of resources and further reducing energy consumption. Therefore, a method for flexibly adjusting a quantity of broadcast message groups based on the downlink resource utilization is provided, to meet a differentiated requirement for a communication resource and better reduce energy consumption.

The foregoing describes a case in which the downlink resource utilization falls within the two downlink resource utilization ranges. It may be understood that the network device may alternatively set three or more downlink resource utilization ranges. For example, a first downlink resource utilization range is [the second preset threshold, the first preset threshold), a second downlink resource utilization range is [a third preset threshold, the second preset threshold), and a third downlink resource utilization range is [0, the third preset threshold). In this case, when the downlink resource utilization falls within the first downlink resource utilization range, the to-be-processed broadcast messages are divided into the N1 broadcast message groups; when the downlink resource utilization falls within the second downlink resource utilization range, the to-be-processed broadcast messages are divided into the N2 broadcast message groups; and when the downlink resource utilization falls within the third downlink resource utilization range, the to-be-processed broadcast messages are divided into an N' broadcast message groups. N1, N2, and N' are all positive integers greater than 1, N1<N2<N', and N' is less than or equal to the total quantity of broadcast beams configured for the cell. By analogy, in a case of more than three ranges, a corresponding quantity of broadcast message groups may be set based on a range within which the downlink resource utilization falls. Therefore, some other specific implementations are provided, to meet a differentiated requirement for a communication resource and reduce energy consumption.

In another optional embodiment, the cell information is the quantity of access users.

When the quantity of access users is less than the first preset user quantity and the quantity of access users is greater than or equal to a second preset user quantity, the to-be-processed broadcast messages are divided into a third quantity of broadcast message groups; and when the quantity of access users is less than the second preset user quantity, the to-be-processed broadcast messages are divided into a fourth quantity of broadcast message groups. Both the third quantity and the fourth quantity are positive integers greater than 1, the third quantity is less than the fourth quantity, and the fourth quantity is less than or equal to a total quantity of broadcast beams configured for the cell.

In this embodiment, when the quantity of access users is less than the first preset user quantity, it is determined that the cell information meets the preset low-load condition; and when the quantity of access users is greater than or equal to the first preset user quantity, it is determined that the cell information does not meet the preset low-load condition.

The network device presets two user quantity ranges, which are a first user quantity range and a second user quantity range. The first user quantity range is [the second preset user quantity, the first preset user quantity), and the second user quantity range is [0, the second preset user quantity). When the quantity of access users falls within the first user quantity range, the to-be-processed broadcast messages are divided into N3 broadcast message groups. When the quantity of access users falls within the second user quantity range, the to-be-processed broadcast messages may be divided into N4 broadcast message groups. N3 is the third quantity, and N4 is the fourth quantity. N4 is greater than N3, that is, there is a negative correlation between the quantity of access users and a quantity of broadcast message groups.

When the quantity of access users falls within the second user quantity range, it indicates that the quantity of access users in the cell is at the lowest level. In this case, there are very few users in the cell. If the to-be-processed broadcast messages are divided into the N3 broadcast message groups, resources are wasted. Compared with a case in which the to-be-processed broadcast messages are divided into the N3 broadcast message groups, after the to-be-processed broadcast messages are divided into the N4 broadcast message groups, each broadcast message group includes fewer broadcast messages, that is, fewer broadcast beams need to be transmitted in each time window, and more broadcast beams can be shut down, thereby reducing a waste of resources and further reducing energy consumption. Therefore, a method for flexibly adjusting a quantity of broadcast message groups based on the quantity of access users is provided, to meet a differentiated requirement for a communication resource and better reduce energy consumption.

The foregoing describes a case in which the quantity of access users falls within the two user quantity ranges. It may be understood that the network device may alternatively set three or more user quantity ranges, and then may determine, based on a correspondence between a user quantity range and a quantity of broadcast message groups, a quantity of broadcast message groups corresponding to the quantity of access users.

In another optional embodiment, the cell information includes the downlink resource utilization and the quantity of access users.

When the downlink resource utilization falls within a first downlink resource utilization range and the quantity of access users falls within a first user quantity range, all broadcast message groups to be sent in one time window are divided into a fifth quantity of broadcast message groups based on the downlink resource utilization and the quantity of access users; and when the downlink resource utilization falls within a second downlink resource utilization range and the quantity of access users falls within a second user quantity range, all broadcast message groups to be sent in one time window are divided into a sixth quantity of broadcast message groups. Both the fifth quantity and the sixth quantity are positive integers greater than 1, the fifth quantity is less than the sixth quantity, and the sixth quantity is less than or equal to a total quantity of broadcast beams configured for the cell.

In this embodiment, when the downlink resource utilization is less than the first preset threshold and the quantity of access users is less than the first preset user quantity, it is determined that the cell information meets the preset low-load condition. When the downlink resource utilization is greater than or equal to the first preset threshold or the quantity of access users is greater than or equal to the first preset user quantity, it is determined that the cell information does not meet the preset low-load condition.

The network device presets two downlink resource utilization ranges and two user quantity ranges. The first downlink resource utilization range is [a second preset threshold, the first preset threshold), and the second downlink resource utilization range is [0, the second preset threshold). The first user quantity range is [a second preset user quantity, the first preset user quantity), and the second user quantity range is [0, the second preset user quantity).

When the downlink resource utilization falls within the first downlink resource utilization range and the quantity of access users falls within the first user quantity range, the to-be-processed broadcast messages are divided into N5 broadcast message groups. When the obtained downlink resource utilization falls within the second downlink resource utilization range and the quantity of access users falls within the second user quantity range, the to-be-processed broadcast messages may be divided into N6 broadcast message groups. N5 is the fifth quantity, N6 is the sixth quantity, and N6 is greater than N5. Therefore, a method for flexibly adjusting a quantity of broadcast message groups based on the downlink resource utilization and the quantity of access users is provided, to meet a differentiated requirement for a communication resource and better reduce energy consumption.

It may be understood that the network device may alternatively set three or more downlink resource utilization ranges and user quantity ranges, and then may determine, based on a correspondence among a downlink resource utilization range, a user quantity range, and a quantity of broadcast message groups, a quantity of broadcast message groups corresponding to the downlink resource utilization and the quantity of access users.

For ease of understanding, the following describes the beamforming-based communication method by using a specific example.

For all broadcast messages to be sent in one time window, each broadcast message occupies one slot. For example, the slots occupied by all the broadcast messages may be shown in Table 1.

TABLE 1

| | SSB | SIB1 | OSI | Paging |
|---|---|---|---|---|
| Slot numbers of all broadcast messages | 0, 1, 2, 3 | 10, 11, 12, 13, 15, 16, 17 | 1, 2 | 10, 11, 12, 13, 15, 16, 17 |

For example, a time window is 20 ms. The time window includes a first frame and a second frame that are adjacent to each other, and the first frame is before the second frame.

Figure 4A:
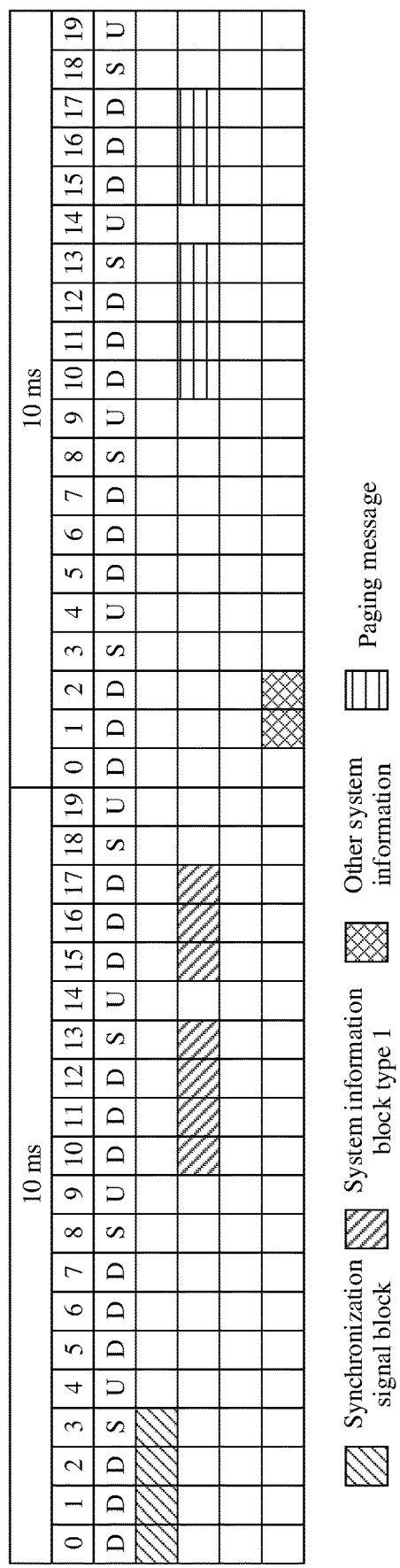
FIG. 4A is a schematic diagram of slots occupied by all broadcast messages in a synchronization signal sending periodicity.

As shown in FIG. 4A, the broadcast messages shown in Table 1 include an SSB, a SIB1, OSI, and Paging. Slots occupied by the SSB include a slot 0, a slot 1, a slot 2, and a slot 3 in the first frame. Slots occupied by the SIB1 include a slot 10, a slot 11, a slot 12, a slot 13, a slot 15, a slot 16, and a slot 17 in the first frame. Slots occupied by the OSI include a slot 1 and a slot 2 in the second frame. Slots occupied by the Paging include a slot 10, a slot 11, a slot 12, a slot 13, a slot 15, a slot 16, and a slot 17 in the second frame.

The to-be-processed broadcast messages may be divided into the plurality of broadcast message groups in a plurality of manners. The following provides an example for description.

In an example, when the downlink resource utilization falls within the first downlink resource utilization range, all the broadcast messages are divided into two broadcast message groups, and slots occupied by each broadcast message group are shown in Table 2.

TABLE 2

| | SSB | SIB1 | OSI | Paging |
|---|---|---|---|---|
| Slot number of a first broadcast message group | 0, 1 | 10, 11, 12, 13 | 1 | 10, 11, 12, 13 |
| Slot number of a second broadcast message group | 2, 3 | 15, 16, 17 | 2 | 15, 16, 17 |

Figure 4B:
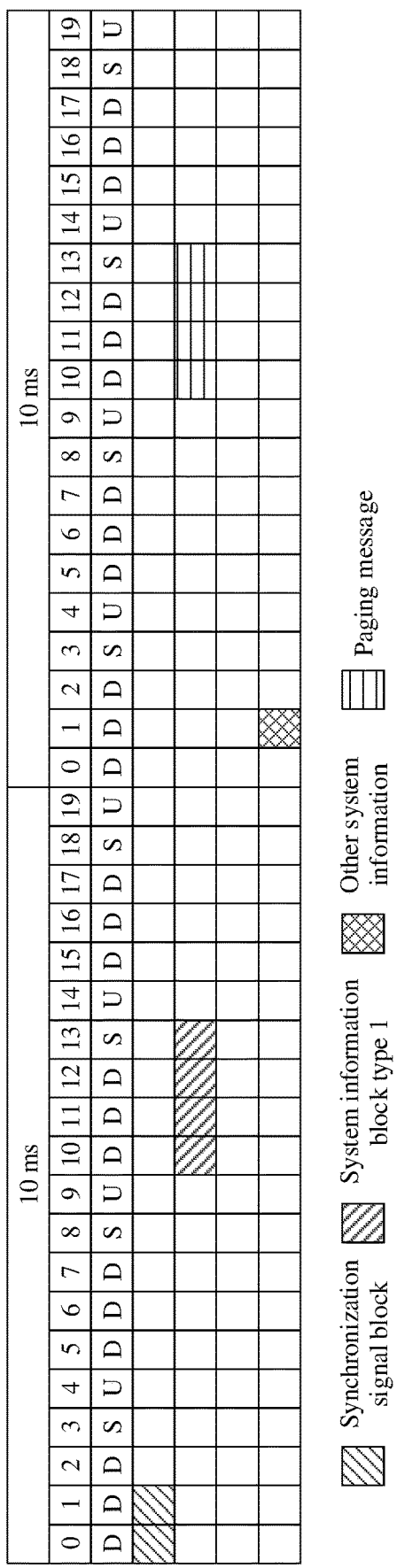
FIG. 4B is a schematic diagram of slots occupied by a first broadcast message group when there are two broadcast message groups.
Figure 4C:
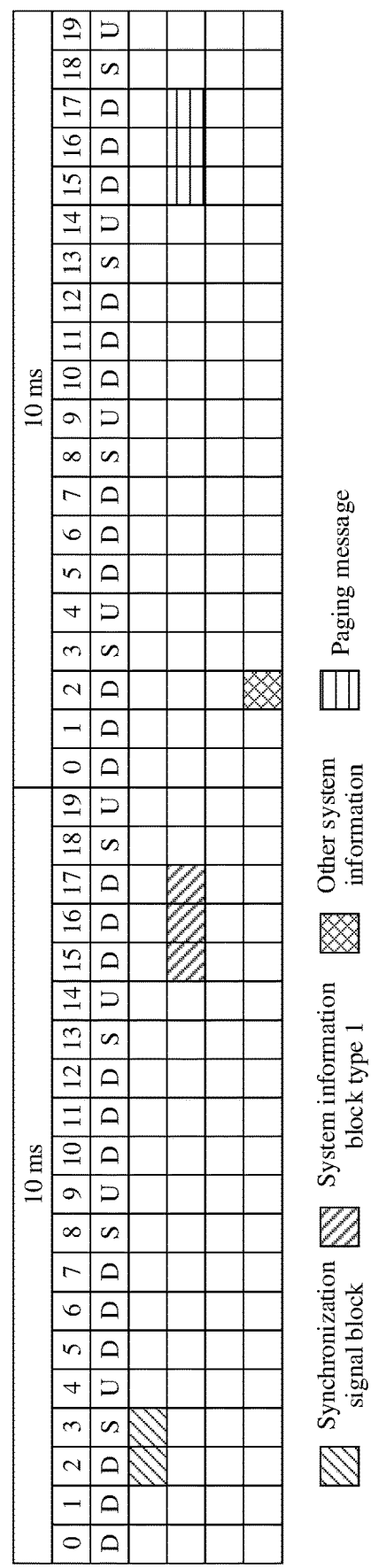
FIG. 4C is a schematic diagram of slots occupied by a second broadcast message group when there are two broadcast message groups.

A broadcast beam (that is, a first broadcast beam group) corresponding to the first broadcast message group, and a broadcast beam (that is, a second broadcast beam group) corresponding to the second broadcast message group are determined FIG. 4B is a schematic diagram of slots occupied by the first broadcast message group shown in Table 2, and FIG. 4C is a schematic diagram of slots occupied by the second broadcast message group shown in Table 2. The following describes the first broadcast beam group and the second broadcast beam group based on FIG. 4B and FIG. 4C.

As shown in FIG. 4B, in a first time window, the first broadcast beam group includes broadcast beams transmitted in the slot 0 and the slot 1 of the first frame, broadcast beams transmitted in the slot 10, the slot 11, the slot 12, and the slot 13 of the first frame, a broadcast beam transmitted in the slot 1 of the second frame, and broadcast beams transmitted in the slot 10, the slot 11, the slot 12, and the slot 13 of the second frame. Broadcast beams for sending no broadcast message include broadcast beams in the slot 2 and the slot 3 of the first frame, broadcast beams in the slot 15, the slot 16, and the slot 17 of the first frame, a broadcast beam in the slot 2 of the second frame, and broadcast beams in the slot 15, the slot 16, and the slot 17 of the second frame.

As shown in FIG. 4C, in a second time window, the second broadcast beam group includes broadcast beams in the slot 2 and the slot 3 of the first frame, broadcast beams in the slot 15, the slot 16, and the slot 17 of the first frame, a broadcast beam in the slot 2 of the second frame, and broadcast beams in the slot 15, the slot 16, and the slot 17 of the second frame. Broadcast beams for sending no broadcast message include broadcast beams in the slot 0 and the slot 1 of the first frame, broadcast beams in the slot 10, the slot 11, the slot 12, and the slot 13 of the first frame, a broadcast beam in the slot 1 of the second frame, and broadcast beams in the slot 10, the slot 11, the slot 12, and the slot 13 of the second frame.

It can be understood that when the first broadcast beam group is transmitted in the first time window, the second broadcast beam group is shut down. When the second broadcast beam group is transmitted in the second time window, the first broadcast beam group is shut down. In this way, some broadcast beams may be shut down in each time window, and a power amplifier corresponding to the broadcast beam that is shut down stops working, thereby reducing energy consumption of the power amplifier.

When the downlink resource utilization falls within the second downlink resource utilization range, all the broadcast messages are divided into four broadcast message groups, and a slot occupied by each broadcast message group is shown in Table 3.

TABLE 3

|  | SSB | SIB1 | OSI | Paging |
|---|---|---|---|---|
| Slot number of a first broadcast message group | 0 | 10, 11 | 1 | 10, 11 |
| Slot number of a second broadcast message group | 1 | 12, 13 | 2 | 12, 13 |
| Slot number of a third broadcast message group | 2 | 15, 16 |  | 15, 16 |
| Slot number of a fourth broadcast message group | 3 | 17 |  | 17 |

A broadcast beam (that is, a first broadcast beam group) corresponding to the first broadcast message group, a broadcast beam (that is, a second broadcast beam group) corresponding to the second broadcast message group, a broadcast beam (that is, a third broadcast beam group) corresponding to the third broadcast message group, and a broadcast beam (that is, a fourth broadcast beam group) corresponding to the fourth broadcast message group are determined.

FIG. 4D, FIG. 4E, FIG. 4F, and FIG. 4G are schematic diagrams of a slot occupied by the first broadcast message group, a slot occupied by the second broadcast message group, a slot occupied by the third broadcast message group, and a slot occupied by the fourth broadcast message group shown in Table 3, respectively. The following separately describes the broadcast beam groups based on FIG. 4D, FIG. 4E, FIG. 4F, and FIG. 4G.

Figure 4D:
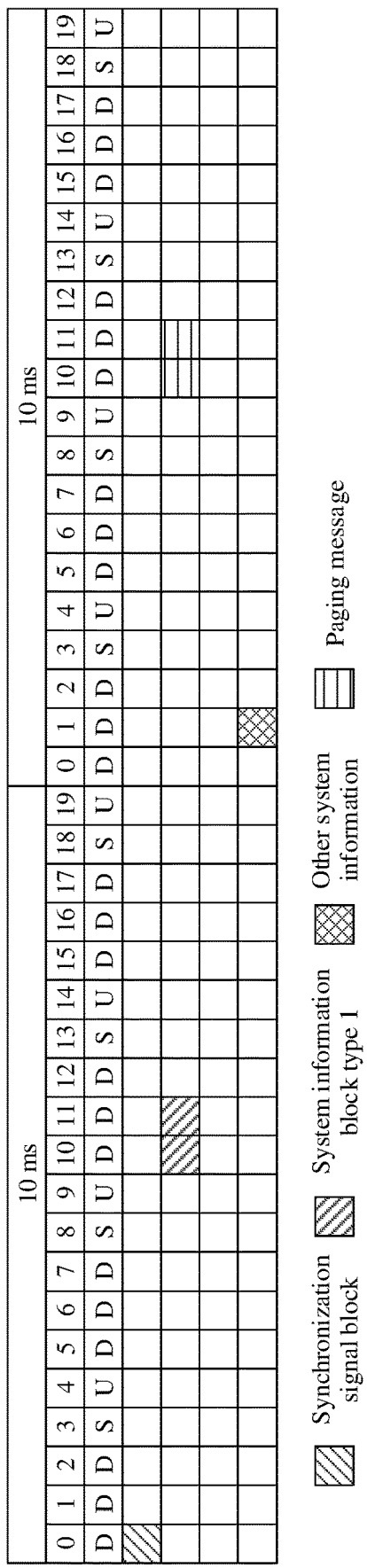
FIG. 4D is a schematic diagram of a slot occupied by a first broadcast message group when there are four broadcast message groups.

As shown in FIG. 4D, in a first time window, the first broadcast beam group includes a broadcast beam transmitted in the slot 0 of the first frame, broadcast beams transmitted in the slot 10 and the slot 11 of the first frame, a broadcast beam transmitted in the slot 1 of the second frame, and broadcast beams transmitted in the slot 10 and the slot 11 of the second frame.

Figure 4E:
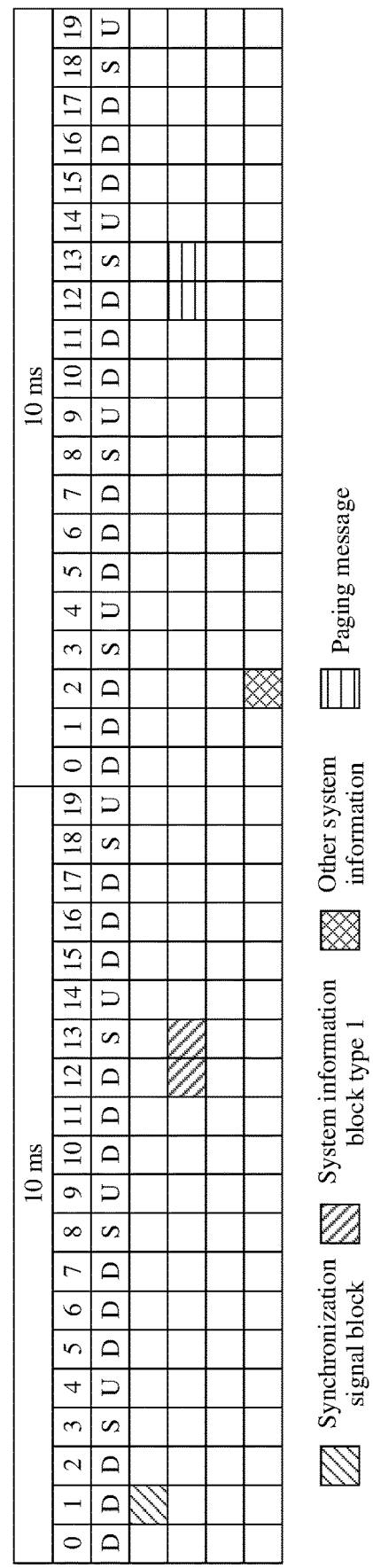
FIG. 4E is a schematic diagram of a slot occupied by a second broadcast message group when there are four broadcast message groups.

As shown in FIG. 4E, in a second time window, the second broadcast beam group includes a broadcast beam in the slot 1 of the first frame, broadcast beams in the slot 12 and the slot 13 of the first frame, a broadcast beam in the slot 2 of the second frame, and broadcast beams in the slot 12 and the slot 13 of the second frame.

Figure 4F:
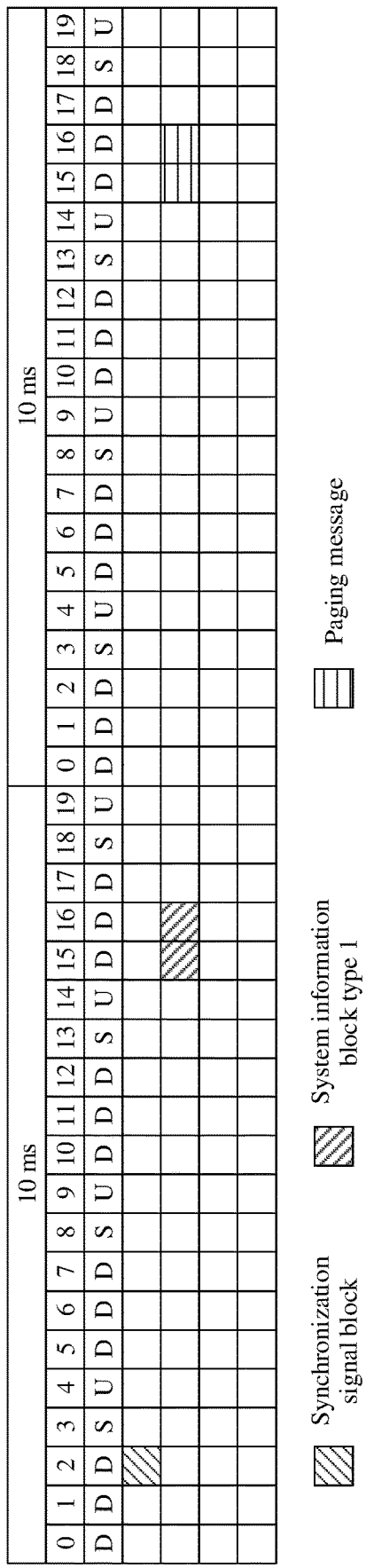
FIG. 4F is a schematic diagram of a slot occupied by a third broadcast message group when there are four broadcast message groups.

As shown in FIG. 4F, in a third time window, the third broadcast beam group includes a broadcast beam transmitted in the slot 2 of the first frame, broadcast beams transmitted in the slot 15 and the slot 16 of the first frame, and broadcast beams transmitted in the slot 15 and the slot 16 of the second frame.

Figure 4G:
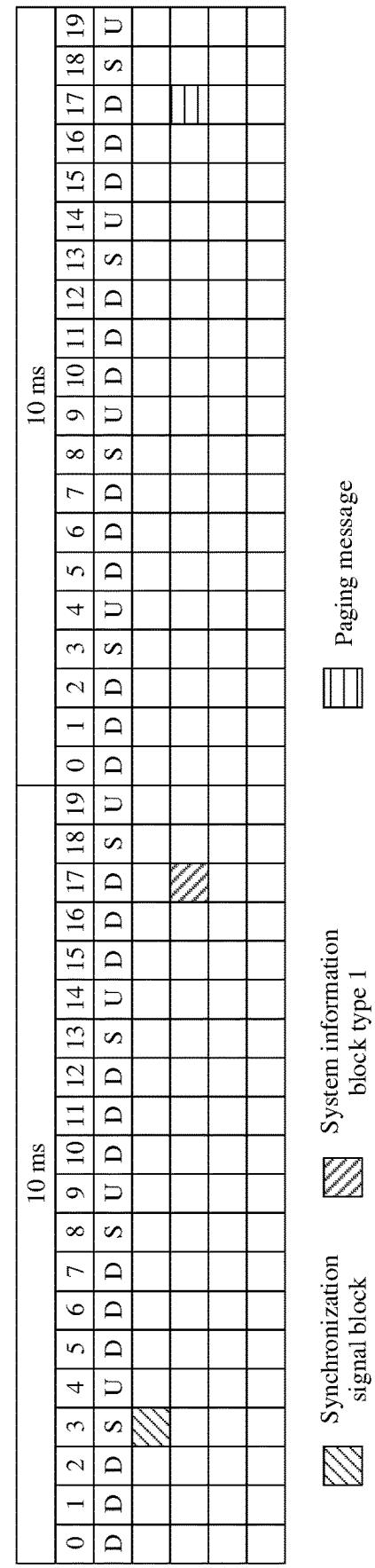
FIG. 4G is a schematic diagram of a slot occupied by a fourth broadcast message group when there are four broadcast message groups.

As shown in FIG. 4G, in a fourth time window, the fourth broadcast beam group includes a broadcast beam in the slot 3 of the first frame, a broadcast beam in the slot 17 of the first frame, and a broadcast beam in the slot 17 of the second frame.

When the first broadcast beam group is transmitted in the first time window, at least one of the second broadcast beam group, the third broadcast beam group, and the fourth broadcast beam group may be shut down. By analogy, when one broadcast beam group is transmitted in each time window, at least one of other broadcast beam groups may be shut down. In this way, some beams may be shut down in each time window, thereby reducing energy consumption of a power amplifier corresponding to the beam that is shut down.

In another example, when the quantity of access users falls within the first user quantity range, all the broadcast messages are divided into two broadcast message groups, and slots occupied by each broadcast message group are shown in Table 2.

When the quantity of access users falls within the second user quantity range, all the broadcast messages are divided into three broadcast message groups, and a slot occupied by each broadcast message group is shown in Table 4.

TABLE 4

|  | SSB | SIB1 | OSI | Paging |
|---|---|---|---|---|
| Slot number of a first broadcast message group | 0, 1 | 10, 11, 12, 13 | 1 | 10, 11, 12, 13 |
| Slot number of a second broadcast message group | 2 | 15, 16 | 2 | 15, 16 |
| Slot number of a third broadcast message group | 3 | 17 |  | 17 |

Table 4 shows a case in which the slots are occupied by the three broadcast message groups.

A broadcast beam (that is, a first broadcast beam group) corresponding to the first broadcast message group, a broadcast beam (that is, a second broadcast beam group) corresponding to the second broadcast message group, and a broadcast beam (that is, a third broadcast beam group) corresponding to the third broadcast message group are determined.

When the first broadcast beam group is transmitted in a first time window, the second broadcast beam group and/or the third broadcast beam group may be shut down. By analogy, when one broadcast beam group is transmitted in each time window, at least one of other broadcast beam groups may be shut down. In this way, some broadcast beams may be shut down in each time window, and a power amplifier corresponding to the broadcast beam that is shut down stops working, thereby reducing energy consumption.

It should be noted that a broadcast message type and a quantity of broadcast messages included in the broadcast message group are not limited to the foregoing examples. This is not limited. In a process of obtaining through division the broadcast message groups, each broadcast message group may include more types of broadcast messages or fewer types of broadcast messages. For example, each broadcast message group may not include a paging message. Alternatively, each broadcast message group may include more or fewer broadcast messages.

In a scenario with a small quantity of users, because a network device continuously sends broadcast messages, a waste of network resources is caused, and a problem of a waste of energy consumption of the device exists. Another method for reducing the waste of network resources and reducing broadcast energy consumption of the network device appears in FIG. 5. This embodiment of a beamforming-based communication method includes the following steps.

Step 501. Obtain cell information.

In this embodiment, the cell information includes downlink resource utilization and/or a quantity of access users.

Step 502. When the cell information meets a preset low-load condition, prolong, based on the cell information, a sending periodicity of a broadcast message.

When the downlink resource utilization is less than a first preset threshold, the quantity of access users is less than a first preset user quantity, or both the foregoing conditions are met, it may be determined that the cell information meets the preset low-load condition. If the cell information meets the preset low-load condition, it indicates that a cell network is in a low-load state or a no-load state; and if the cell information does not meet the preset low-load condition, it indicates that the cell network is in a high-load state or a normal-load state.

The first preset threshold may be a ratio of a total quantity of slots occupied by a broadcast message in a time window to a total quantity of downlink slots, or a value that is set based on actual application. The value is not limited. A specific value of the first preset user quantity may be set based on actual experience, and this is not limited.

The broadcast message includes at least one of a synchronization signal block, a SIB1 message, OSI, or a paging message.

Step 503. Send the broadcast message based on the prolonged sending periodicity.

A sending periodicity that is not prolonged is preset duration, and the prolonged sending periodicity is greater than the preset duration. Compared with sending the broadcast message based on the preset duration, sending the broadcast message based on the prolonged sending periodicity only requires a smaller quantity of sending times of the broadcast message. In this way, fewer broadcast beams need to be used, thereby reducing energy consumption of a network device.

Prolonging the sending periodicity of the broadcast message may be prolonging a sending periodicity or sending periodicities of one or more broadcast messages. The following provides detailed descriptions.

In an optional embodiment, the cell information is the downlink resource utilization, and the broadcast message is the synchronization signal block.

The prolonging, based on the cell information, a sending periodicity of a broadcast message includes: when the downlink resource utilization is less than the first preset threshold and the downlink resource utilization is greater than or equal to a second preset threshold, adjusting a sending periodicity of the synchronization signal block from the preset duration to first duration; and when the downlink resource utilization is less than the second preset threshold, adjusting the sending periodicity of the synchronization signal block from the preset duration to second duration.

In this embodiment, the network device presets two downlink resource utilization ranges. A first downlink resource utilization range is [the second preset threshold, the first preset threshold), and a second downlink resource utilization range is [0, the second preset threshold). The first duration is greater than the preset duration, and the second duration is greater than the first duration.

The network device determines, based on a preset correspondence between a downlink resource utilization range and a sending periodicity, a sending periodicity corresponding to the downlink resource utilization.

For example, in the preset correspondence between a downlink resource utilization range and a sending periodicity, the preset duration is 20 ms, a sending periodicity corresponding to the first downlink resource utilization range is 40 ms, and a sending periodicity corresponding to the second downlink resource utilization range is 80 ms.

In another example, the preset duration is 20 ms, a sending periodicity corresponding to the first downlink resource utilization range is 80 ms, and a sending periodicity corresponding to the second downlink resource utilization range is 160 ms. The preset duration may be but is not limited to 20 ms, 40 ms, 80 ms, or 160 ms. Values of the preset duration, the first duration, and the second duration are not limited to the foregoing examples.

For another type of broadcast message, for example, the SIB1 message, the OSI, or the paging message, a manner of prolonging, based on the cell information, a sending periodicity of the SIB1 message, a sending periodicity of the OSI, or a sending periodicity of the paging message is similar to a manner of prolonging, based on the cell information, the synchronization signal block.

The foregoing example shows only two downlink resource utilization ranges. Alternatively, the network device may configure more than three ranges, and then determine, based on the preset correspondence between a downlink resource utilization range and a sending periodicity, the sending periodicity corresponding to the downlink resource utilization.

It can be understood that there is a negative correlation between the downlink resource utilization and the sending periodicity of the broadcast message. Lower downlink resource utilization indicates a longer sending periodicity of the broadcast message and fewer broadcast beams for sending the broadcast message in each periodicity. In this way, working power amplifiers can be reduced, to reduce more energy consumption. Therefore, a method for flexibly adjusting the sending periodicity of the broadcast message based on the downlink resource utilization is provided, to meet a differentiated requirement for a communication resource and better reduce energy consumption.

For ease of understanding, the following describes a correspondence between a downlink resource utilization range and a sending periodicity of a SIB1 message by using an example. The network device presets two downlink resource utilization ranges. A first downlink resource utilization range is [the second preset threshold, the first preset threshold), and a second downlink resource utilization range is [0, the second preset threshold). A periodicity corresponding to the first downlink resource utilization range is 80 ms, and a periodicity corresponding to the second downlink resource utilization range is 160 ms.

Figure 6A:
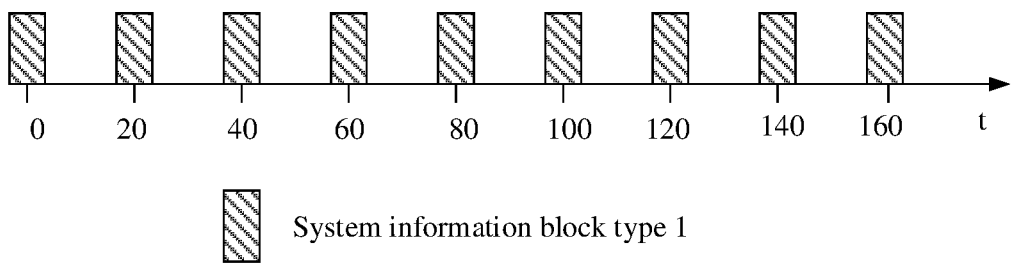
FIG. 6A is a schematic diagram of periodically sending a SIB1.
Figure 6B:
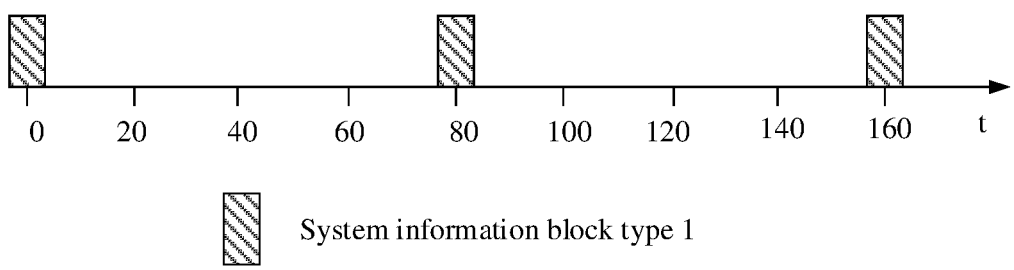
FIG. 6B is another schematic diagram of periodically sending a SIB1.
Figure 6C:
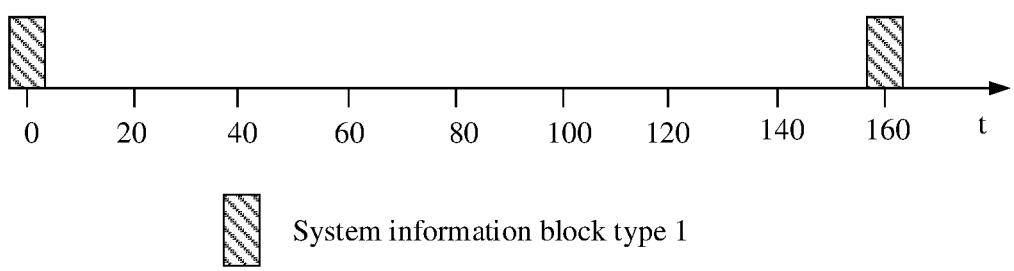
FIG. 6C is another schematic diagram of periodically sending a SIB1.

FIG. 6A, FIG. 6B, and FIG. 6C are schematic diagrams of sending SIB1s in different sending periodicities. As shown in FIG. 6A, when the downlink resource utilization is greater than the first preset threshold, a periodicity for sending the SIB1 by the network device is 20 ms. As shown in FIG. 6B, when the downlink resource utilization is less than the first preset threshold and the downlink resource utilization is greater than or equal to the second preset threshold, a periodicity for sending the SIB1 by the network device is 80 ms. As shown in FIG. 6C, when the downlink resource utilization is less than the second preset threshold, a periodicity for sending the SIB1 by the network device is 160 ms.

In another optional embodiment, the cell information is the quantity of access users, and the broadcast message is the synchronization signal block.

The prolonging, based on the cell information, a sending periodicity of a broadcast message includes: when the quantity of access users is less than the first preset user quantity and the quantity of access users is greater than or equal to a second preset user quantity, adjusting the sending periodicity of the broadcast message from preset duration to third duration, where the third duration is greater than the preset duration; and when the quantity of access users is less than the second preset user quantity, adjusting the sending periodicity of the broadcast message from the preset duration to fourth duration. The fourth duration is greater than the third duration.

In this embodiment, the network device presets two user quantity ranges. A first user quantity range is [the second preset threshold, the first preset threshold), and a second user quantity range is [0, the second preset threshold).

The network device determines, based on a preset correspondence between a user quantity range and a sending periodicity, a sending periodicity corresponding to the quantity of access users. For example, in the preset correspondence between a user quantity range and a sending periodicity, the preset duration is 20 ms, a sending periodicity corresponding to the first user quantity range is 40 ms, and a sending periodicity corresponding to the second user quantity range is 80 ms. In another example, the preset duration is 20 ms, a sending periodicity corresponding to the first user quantity range is 80 ms, and a sending periodicity corresponding to the second user quantity range is 160 ms.

For another type of broadcast message, for example, the SIB1 message, the OSI, or the paging message, a manner of prolonging, based on the cell information, a sending periodicity of the SIB1 message, a sending periodicity of the OSI, or a sending periodicity of the paging message is similar to a manner of prolonging, based on the cell information, the synchronization signal block. Details are not described herein again. In the foregoing example, the preset duration is 20 ms, the third duration is 40 ms or 80 ms, and the fourth duration is 80 ms or 160 ms. It may be understood that values of the preset duration, the third duration, and the fourth duration are not limited to the foregoing examples. The preset duration may be but is not limited to 20 ms, 40 ms, 80 ms, or 160 ms.

The foregoing example shows only two user quantity ranges. Alternatively, the network device may configure more than three user quantity ranges, and then determine, based on the preset correspondence between a user quantity range and a sending periodicity, the sending periodicity corresponding to the quantity of access users.

It can be understood that there is a negative correlation between the quantity of access users and the sending periodicity of the broadcast message. A smaller quantity of access users indicates a longer sending periodicity of the broadcast message and fewer broadcast beams for sending the broadcast message in each periodicity. In this way, working power amplifiers can be reduced, to reduce more energy consumption. Therefore, a method for flexibly adjusting the sending periodicity of the broadcast message based on the quantity of access users is provided, to meet a differentiated requirement for a communication resource and better reduce energy consumption.

In another optional embodiment, the cell information includes the downlink resource utilization and the quantity of access users, and the broadcast message is the synchronization signal block.

The prolonging, based on the cell information, a sending periodicity of a broadcast message includes: when the downlink resource utilization falls within a first downlink resource utilization range and the quantity of access users falls within a first user quantity range, adjusting the sending periodicity of the broadcast message from preset duration to fifth duration; and when the downlink resource utilization falls within a second downlink resource utilization range and the quantity of access users falls within a second user quantity range, adjusting the sending periodicity of the broadcast message from the preset duration to sixth duration.

In this embodiment, the fifth duration is greater than the preset duration, the first downlink resource utilization range is a range that is less than the first preset threshold and not less than a second preset threshold, and the first user quantity range is a range that is less than the first preset user quantity and not less than a second preset user quantity. The sixth duration is greater than the fifth duration, the second downlink resource utilization range is a range that is less than the second preset threshold, and the second user quantity range is a range that is less than the second preset user quantity.

A correspondence among a downlink resource utilization range, an access user quantity range, and a sending periodicity of the synchronization signal block may be shown in Table 5.

TABLE 5

| Downlink resource utilization range | Access user quantity range | Sending periodicity of a synchronization signal block |
|---|---|---|
| Greater than or equal to a first preset threshold | Greater than or equal to a first preset user quantity | 20 ms |
| First downlink resource utilization range | First user quantity range | 40 ms |
| Second downlink resource utilization range | Second user quantity range | 80 ms |

In Table 5, the preset duration is 20 ms, the fifth duration is 40 ms, and the sixth duration is 80 ms. It may be understood that values of the preset duration, the fifth duration, and the sixth duration are not limited to the foregoing examples.

The foregoing example shows only two downlink resource utilization ranges and two user quantity ranges. Alternatively, the network device may configure more than three downlink resource utilization ranges and user quantity ranges, and then determine a corresponding sending periodicity based on a preset correspondence among a downlink resource utilization range, a user quantity range, and a sending periodicity.

Therefore, a method for flexibly adjusting the sending periodicity of the broadcast message based on the downlink resource utilization and the quantity of access users is provided, to meet a differentiated requirement for a communication resource and better reduce energy consumption.

The foregoing describes a process of periodically sending the broadcast message (for example, the OSI). However, during actual application, the network device usually sends the OSI in an on-demand sending mode. The on-demand sending mode means that after a terminal sends an OSI request, the network device broadcasts the OSI based on the OSI request.

Figure 7:
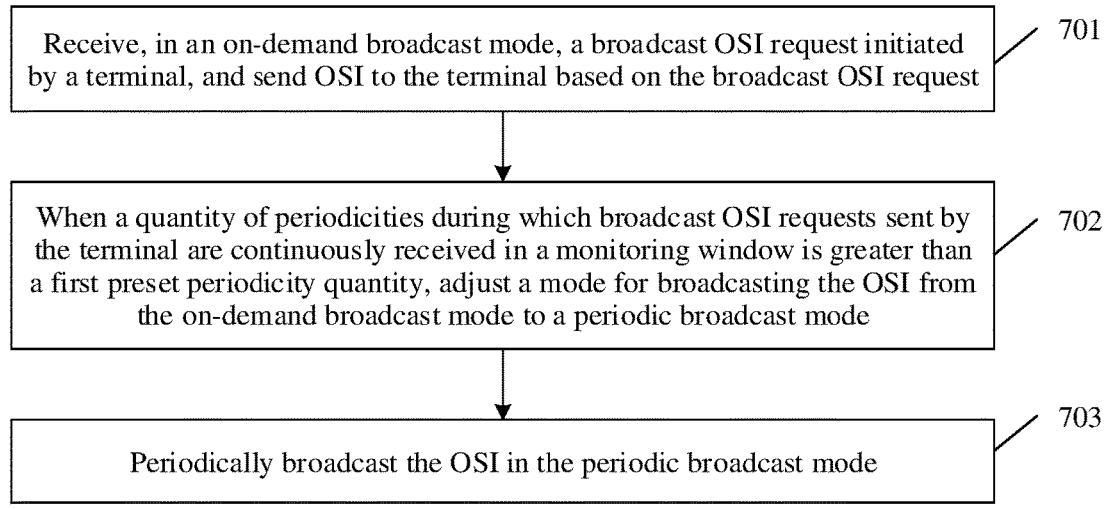
FIG. 7 is another flowchart of a beamforming-based communication method.

As shown in FIG. 7, another embodiment of a beamforming-based communication method includes the following steps.

Step 701. Receive, in an on-demand broadcast mode, a broadcast OSI request initiated by a terminal, and send OSI to the terminal based on the broadcast OSI request.

Step 702. When a quantity of periodicities during which broadcast OSI requests sent by the terminal are continuously received in a monitoring window is greater than or equal to a first preset periodicity quantity, adjust a mode for broadcasting the OSI from the on-demand broadcast mode to a periodic broadcast mode.

When the quantity of periodicities during which the broadcast OSI requests sent by the terminal are continuously received in the monitoring window is greater than the first preset periodicity quantity, it indicates that a large quantity of users initiates requests in a cell. Because traffic of the cell is heavy, a network device adjusts the mode for broadcasting the OSI from the on-demand broadcast mode to the periodic broadcast mode.

Step 703. Periodically broadcast the OSI in the periodic broadcast mode.

In this embodiment, in a heavy traffic scenario, UE does not need to send an OSI request to the network device and can directly obtain OSI by periodically monitoring the OSI. Therefore, the network device does not need to receive and process OSI requests of a large quantity of UEs, thereby reducing energy consumption of the network device.

In an optional embodiment, the method further includes: when a quantity of periodicities for broadcasting the OSI is greater than or equal to a second preset periodicity quantity, adjusting the mode for broadcasting the OSI from the periodic broadcast mode to the on-demand broadcast mode. Values of the first preset periodicity quantity and the second preset periodicity quantity may be set based on actual application, and this is not limited herein.

Figure 8:
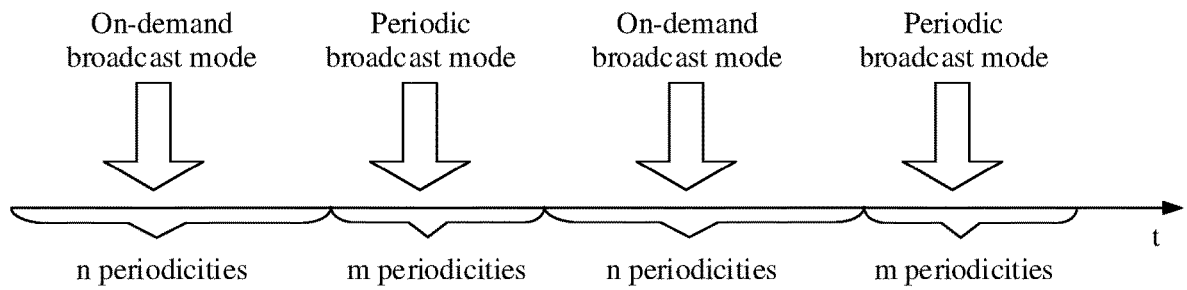
FIG. 8 is a schematic diagram of sending OSI in different modes.

FIG. 8 is a schematic diagram of broadcasting OSI. In an on-demand broadcast mode, when broadcast OSI requests sent by a terminal are received in a monitoring window in n consecutive periodicities, and n is greater than a first preset periodicity quantity, a network device periodically broadcasts the OSI. After broadcasting the OSI in m consecutive periodicities, the network device may switch from a periodic broadcast mode to the on-demand broadcast mode, and the process is cyclically performed in the foregoing manner. n and m are integers greater than 1, and specific values may be set based on an actual situation.

Figure 9:
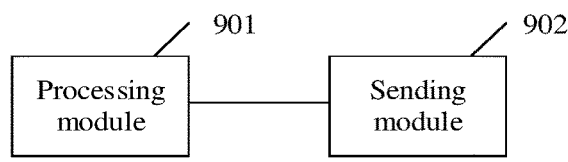
FIG. 9 is another schematic diagram of a structure of a network device.

A network device can implement the beamforming-based communication method in the embodiment shown in FIG. 3 or the optional embodiment shown in FIG. 9. This embodiment of a network device includes:

a processing module 901, configured to obtain cell information, where the processing module 901 is further configured to: when the cell information meets a preset low-load condition, divide, based on the cell information, to-be-processed broadcast messages into a plurality of broadcast message groups, where each broadcast message group corresponds to one time window, and a length of each time window is equal to a synchronization signal sending periodicity; and the processing module 901 is further configured to determine, based on a preset correspondence between a broadcast message and a broadcast beam, a broadcast beam group corresponding to each broadcast message group and a broadcast beam for sending no broadcast message in each time window; and a sending module 902, configured to send a broadcast message group in each time window by using the broadcast beam group, where the processing module 901 is further configured to shut down, in each time window, the broadcast beam for sending no broadcast message.

In an optional embodiment, the cell information is downlink resource utilization; and the processing module 901 is further configured to: when the downlink resource utilization is less than a first preset threshold, determine that the cell information meets the preset low-load condition.

Optionally, the processing module 901 is configured to: when the downlink resource utilization is less than the first preset threshold and the downlink resource utilization is greater than or equal to a second preset threshold, divide the to-be-processed broadcast messages into a first quantity of broadcast message groups; and when the downlink resource utilization is less than the second preset threshold, divide the to-be-processed broadcast messages into a second quantity of broadcast message groups, where both the first quantity and the second quantity are positive integers greater than 1, the first quantity is less than the second quantity, and the second quantity is less than or equal to a total quantity of broadcast beams configured for a cell.

In another optional embodiment, the cell information is a quantity of access users; and the processing module 901 is further configured to: when the quantity of access users is less than a first preset user quantity, determine that the cell information meets the preset low-load condition.

Optionally, the processing module 901 is further configured to: when the quantity of access users is less than the first preset user quantity and the quantity of access users is greater than or equal to a second preset user quantity, divide the to-be-processed broadcast messages into a third quantity of broadcast message groups; and when the quantity of access users is less than the second preset user quantity, divide the to-be-processed broadcast messages into a fourth quantity of broadcast message groups, where both the third quantity and the fourth quantity are positive integers greater than 1, the third quantity is less than the fourth quantity, and the fourth quantity is less than or equal to a total quantity of broadcast beams configured for a cell.

In another optional embodiment, the cell information includes downlink resource utilization and a quantity of access users; and the processing module 901 is further configured to: when the downlink resource utilization is less than a first preset threshold and the quantity of access users is less than a first preset user quantity, determine that the cell information meets the preset low-load condition.

Optionally, the processing module 901 is further configured to: when the downlink resource utilization falls within a first downlink resource utilization range and the quantity of access users falls within a first user quantity range, divide the to-be-processed broadcast messages into a fifth quantity of broadcast message groups, where the first downlink resource utilization range is a range that is less than the first preset threshold and not less than a second preset threshold, and the first user quantity range is a range that is less than the first preset user quantity and not less than a second preset user quantity; and when the downlink resource utilization falls within a second downlink resource utilization range and the quantity of access users falls within a second user quantity range, divide the to-be-processed broadcast messages into a sixth quantity of broadcast message groups, where both the fifth quantity and the sixth quantity are positive integers greater than 1, the fifth quantity is less than the sixth quantity, and the sixth quantity is less than or equal to a total quantity of broadcast beams configured for a cell. The second downlink resource utilization range is a range that is less than the second preset threshold, and the second user quantity range is a range that is less than the second preset user quantity.

In the embodiment shown in FIG. 9 or the optional embodiment, the broadcast message includes at least one of a synchronization signal block, a SIB1 message, OSI, or a paging message.

Figure 5:
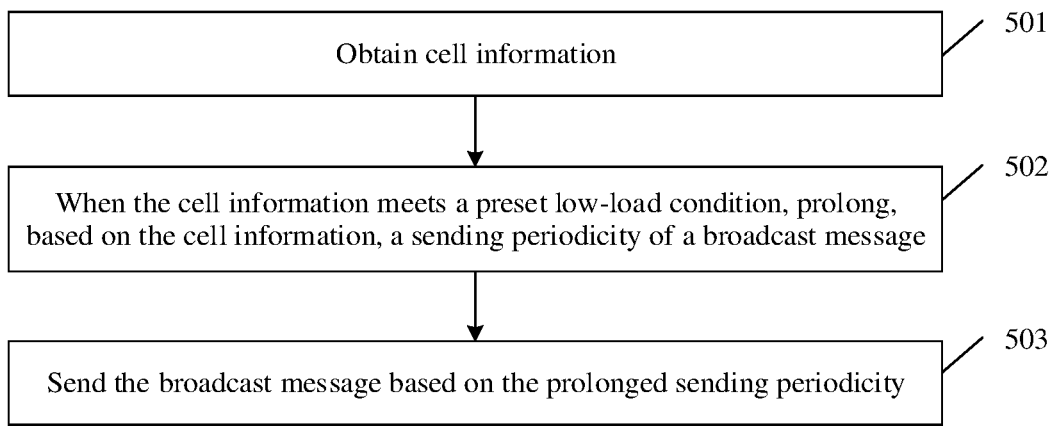
FIG. 5 is another flowchart of a beamforming-based communication.
Figure 10:
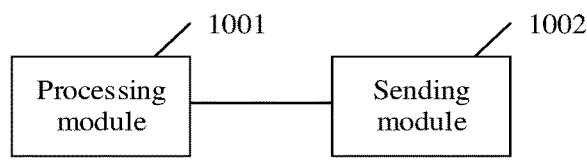
FIG. 10 is another schematic diagram of a structure of a network device.

A network device can implement the beamforming-based communication method in the embodiment shown in FIG. 5 or the optional embodiment shown in FIG. 10. This embodiment of a network device includes:

a processing module 1001, configured to obtain cell information, where
the processing module 1001 is further configured to: when the cell information meets a preset low-load condition, prolong, based on the cell information, a sending periodicity of a broadcast message; and
a sending module 1002, configured to send the broadcast message based on the prolonged sending periodicity.

In an optional embodiment, the cell information is downlink resource utilization; and
the processing module 1001 is further configured to: when the downlink resource utilization is less than a first preset threshold, determine that the cell information meets the preset low-load condition.

Optionally, the processing module 1001 is configured to: when the downlink resource utilization is less than the first preset threshold and the downlink resource utilization is greater than or equal to a second preset threshold, adjust the sending periodicity of the broadcast message from preset duration to first duration, where the first duration is greater than the preset duration; and when the downlink resource utilization is less than the second preset threshold, adjust the sending periodicity of the broadcast message from the preset duration to second duration, where the second duration is greater than the first duration.

In another optional embodiment, the cell information is a quantity of access users; and
the processing module 1001 is further configured to: when the quantity of access users is less than a first preset user quantity, determine that the cell information meets the preset low-load condition.

Optionally, the processing module 1001 is configured to: when the quantity of access users is less than the first preset user quantity and the quantity of access users is greater than or equal to a second preset user quantity, adjust the sending periodicity of the broadcast message from preset duration to third duration, where the third duration is greater than the preset duration; and when the quantity of access users is less than the second preset user quantity, adjust the sending periodicity of the broadcast message from the preset duration to fourth duration, where the fourth duration is greater than the third duration.

In another optional embodiment,
the cell information includes downlink resource utilization and a quantity of access users; and
the processing module 1001 is further configured to: when the downlink resource utilization is less than a first preset threshold and the quantity of access users is less than a first preset user quantity, determine that the cell information meets the preset low-load condition.

Optionally, the processing module 1001 is configured to: when the downlink resource utilization falls within a first downlink resource utilization range and the quantity of access users falls within a first user quantity range, adjust the sending periodicity of the broadcast message from preset duration to fifth duration, where the fifth duration is greater than the preset duration, the first downlink resource utilization range is a range that is less than the first preset threshold and not less than a second preset threshold, and the first user quantity range is a range that is less than the first preset user quantity and not less than a second preset user quantity; and when the downlink resource utilization falls within a second downlink resource utilization range and the quantity of access users falls within a second user quantity range, adjust the sending periodicity of the broadcast message from the preset duration to sixth duration, where the sixth duration is greater than the fifth duration, the second downlink resource utilization range is a range that is less than the second preset threshold, and the second user quantity range is a range that is less than the second preset user quantity.

In the embodiment shown in FIG. 10 or the optional embodiment, the broadcast message includes at least one of a synchronization signal block, a SIB1 message, OSI, or a paging message.

Figure 11:
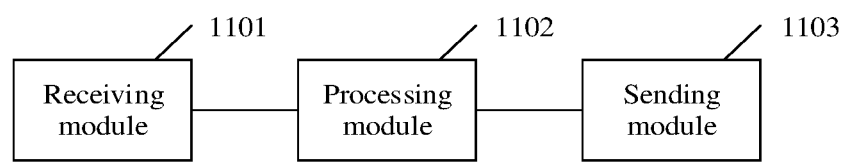
FIG. 11 is another schematic diagram of a structure of a network device.

A network device can implement the beamforming-based communication method in the embodiment shown in FIG. 7 or the optional embodiment shown in FIG. 11. This embodiment of a network device includes a receiving module 1101, a processing module 1102, and a sending module 1103.

The receiving module 1101 is configured to receive, in an on-demand broadcast mode, a broadcast other system information OSI request initiated by a terminal.

The sending module 1103 is configured to send OSI to the terminal based on the broadcast OSI request.

The processing module 1102 is configured to: when a quantity of periodicities during which broadcast OSI requests sent by the terminal are continuously received in a monitoring window is greater than a first preset periodicity quantity, adjust a mode for broadcasting the OSI from the on-demand broadcast mode to a periodic broadcast mode.

The sending module 1103 is further configured to periodically broadcast the OSI in the periodic broadcast mode.

In an optional embodiment,
the processing module 1102 is further configured to: when a quantity of periodicities for broadcasting the OSI is greater than or equal to a second preset periodicity quantity, adjust the mode for broadcasting the OSI from the periodic broadcast mode to the on-demand broadcast mode.

A computer storage medium stores instructions. When the instructions are run on a computer, the computer is enabled to perform the beamforming-based communication method in the foregoing embodiment.

All or some of the foregoing embodiments may be implemented by using software, hardware, firmware, or any combination thereof. When the software is used to implement the embodiments, all or some of the embodiments may be implemented in a form of a computer program product.

The computer program product includes one or more computer instructions. When the computer program instructions are loaded and executed on a computer, the procedures or the functions according to the embodiments are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, a computer, a server, or a data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

The foregoing embodiments are merely intended for describing the solutions of the embodiments, and should not be considered as limiting. Although the embodiments are described in detail, a person of ordinary skill may still make modifications to the solutions described in the foregoing embodiments or make equivalent replacements to some features thereof, without departing from the scope of the embodiments.

What is claimed is:

1. A beamforming-based communication method performed by
a processor,
a memory is coupled to the processor, and the memory comprises instructions that, when executed by the processor, cause the processor to perform operations comprising:
obtaining cell information;
when the cell information meets a preset low-load condition, dividing, based on the cell information, to-be-processed broadcast messages into a plurality of broadcast message groups, wherein the to-be-processed broadcast messages are all broadcast messages to be sent in a time window, each broadcast message group corresponds to one time window, and a length of each time window is equal to a synchronization signal sending periodicity;
wherein the cell information is downlink resource utilization; and the operations further comprise:
based on the downlink resource utilization being less than a first preset threshold, determining that the cell information meets the preset low-load condition and
when the downlink resource utilization is less than the first preset threshold and the downlink resource utilization is greater than or equal to a second preset threshold, dividing the to-be-processed broadcast messages into a first quantity of broadcast message groups; and
when the downlink resource utilization is less than the second preset threshold, dividing the to-be-processed broadcast messages into a second quantity of broadcast message groups, wherein both the first quantity and the second quantity are positive integers greater than 1, the first quantity is less than the second quantity, and the second quantity is less than or equal to a total quantity of broadcast beams configured for a cell;
determining, based on a preset correspondence between a broadcast message and a broadcast beam, a broadcast beam group corresponding to each broadcast message group and a broadcast beam for sending no broadcast message in each time window;
sending the broadcast message group in each time window by using the broadcast beam group; and
shutting down, in each time window, the broadcast beam for sending no broadcast message.

2. The beamforming-based communication method according to claim 1, wherein the broadcast message comprises at least one of a synchronization signal block, a system information block type 1 (SIB1) message, other system information (OSI), or a paging message.

3. A beamforming-based communication method performed by a processor,
a memory is coupled to the processor, and the memory comprises instructions that, when executed by the processor, cause the processor to perform operations comprising:
obtaining cell information;
when the cell information meets a preset low-load condition, dividing, based on the cell information, to-be-processed broadcast messages into a plurality of broadcast message groups, wherein the to-be-processed broadcast messages are all broadcast messages to be sent in a time window, each broadcast message group corresponds to one time window, and a length of each time window is equal to a synchronization signal sending periodicity; wherein the cell information is a quantity of access users;
based on the quantity of access users being less than a first preset user quantity, determining that the cell information meets the preset low-load condition;
when the quantity of access users is less than the first preset user quantity and the quantity of access users is greater than or equal to a second preset user quantity, dividing the to-be-processed broadcast messages into a third quantity of broadcast message groups; and
when the quantity of access users is less than the second preset user quantity, dividing the to-be-processed broadcast messages into a fourth quantity of broadcast message groups, wherein both the third quantity and the fourth quantity are positive integers greater than 1, the third quantity is less than the fourth quantity, and the fourth quantity is less than or equal to a total quantity of broadcast beams configured for a cell;
determining, based on a preset correspondence between a broadcast message and a broadcast beam, a broadcast beam group corresponding to each broadcast message group and a broadcast beam for sending no broadcast message in each time window;
sending the broadcast message group in each time window by using the broadcast beam group; and
shutting down, in each time window, the broadcast beam for sending no broadcast message.

4. The beamforming-based communication method according to claim 3, wherein the broadcast message comprises at least one of a synchronization signal block, a system information block type 1 (SIB1) message, other system information (OSI), or a paging message.

5. A beamforming-based communication method comprising:
   executed by a processor,
   a memory is coupled to the processor, and the memory comprises instructions that, when executed by the processor, cause the processor to perform operations comprising:
   obtaining cell information;
   when the cell information meets a preset low-load condition, dividing, based on the cell information, to-be-processed broadcast messages into a plurality of broadcast message groups, wherein the to-be-processed broadcast messages are all broadcast messages to be sent in a time window, each broadcast message group corresponds to one time window, and a length of each time window is equal to a synchronization signal sending periodicity; wherein the cell information compromises downlink resource utilization and a quantity of access users;
   based on the downlink resource utilization being less than a first preset threshold and the quantity of access users is less than a first preset user quantity, determining that the cell information meets the preset low-load condition;
   when the downlink resource utilization falls within a first downlink resource utilization range and the quantity of access users falls within a first user quantity range, dividing the to-be-processed broadcast messages into a fifth quantity of broadcast message groups, wherein the first downlink resource utilization range is a range that is less than the first preset threshold and not less than a second preset threshold, and the first user quantity range is a range that is less than the first preset user quantity and not less than a second preset user quantity; and
   when the downlink resource utilization falls within a second downlink resource utilization range and the quantity of access users falls within a second user quantity range, dividing the to-be-processed broadcast messages into a sixth quantity of broadcast message groups, wherein the second downlink resource utilization range is a range that is less than the second preset threshold, the second user quantity range is a range that is less than the second preset user quantity, both the fifth quantity and the sixth quantity are positive integers greater than 1, the fifth quantity is less than the sixth quantity, and the sixth quantity is less than or equal to a total quantity of broadcast beams configured for a cell;
   determining, based on a preset correspondence between a broadcast message and a broadcast beam, a broadcast beam group corresponding to each broadcast message group and a broadcast beam for sending no broadcast message in each time window;
   sending the broadcast message group in each time window by using the broadcast beam group; and
   shutting down, in each time window, the broadcast beam for sending no broadcast message.

6. The beamforming-based communication method according to claim 5, wherein the broadcast message comprises at least one of a synchronization signal block, a system information block type 1 (SIB1) message, other system information (OSI), or a paging message.

7. A communication apparatus comprising:
   a processor; and
   a memory coupled to the processor, wherein the memory comprises instructions that, when executed by the processor, the apparatus is configured to perform operations comprising:
   obtaining cell information;
   when the cell information meets a preset low-load condition, dividing, based on the cell information, to-be-processed broadcast messages into a plurality of broadcast message groups, wherein the to-be-processed broadcast messages are all broadcast messages to be sent in a time window, each broadcast message group corresponds to one time window, and a length of each time window is equal to a synchronization signal sending periodicity; wherein the cell information is downlink resource utilization; and the operations further comprise:
   when the downlink resource utilization is less than a first preset threshold, determining that the cell information meets the preset low-load condition and
   when the downlink resource utilization is less than the first preset threshold and the downlink resource utilization is greater than or equal to a second preset threshold, dividing the to-be-processed broadcast messages into a first quantity of broadcast message groups; and
   when the downlink resource utilization is less than the second preset threshold, dividing the to-be-processed broadcast messages into a second quantity of broadcast message groups, wherein both the first quantity and the second quantity are positive integers greater than 1, the first quantity is less than the second quantity, and the second quantity is less than or equal to a total quantity of broadcast beams configured for a cell;
   determining, based on a preset correspondence between a broadcast message and a broadcast beam, a broadcast beam group corresponding to each broadcast message group and a broadcast beam for sending no broadcast message in each time window;
   sending the broadcast message group in each time window by using the broadcast beam group; and
   shutting down, in each time window, the broadcast beam for sending no broadcast message.

8. The communication apparatus according to claim 7, wherein the broadcast message comprises at least one of a synchronization signal block, a system information block type 1 (SIB1) message, other system information (OSI), or a paging message.

9. A communication apparatus comprising:
   a processor; and
   a memory coupled to the processor, wherein the memory comprises instructions that, when executed by the processor, the apparatus is configured to perform operations comprising:
   obtaining cell information;
   when the cell information meets a preset low-load condition, dividing, based on the cell information, to-be-processed broadcast messages into a plurality of broadcast message groups, wherein the to-be-processed broadcast messages are all broadcast messages to be sent in a time window, each broadcast message group corresponds to one time window, and a length of each time window is equal to a synchronization signal sending periodicity; wherein the cell information is a quantity of access users; and when the quantity of access users is less than a first preset user quantity, determining that the cell information meets the preset low-load condition, when the quantity of access users is less than the first preset user quantity and the quantity of access users is greater than or equal to a second preset user quantity, dividing the to-be-processed broadcast messages into a third quantity of broadcast message groups; and when the quantity of access users is less than the second preset user quantity, dividing the to-be-processed broadcast messages into a fourth quantity of broadcast message groups, wherein both the third quantity and the fourth quantity are positive integers greater than 1, the third quantity is less than the fourth quantity, and the fourth quantity is less than or equal to a total quantity of broadcast beams configured for a cell;

determining, based on a preset correspondence between a broadcast message and a broadcast beam, a broadcast beam group corresponding to each broadcast message group and a broadcast beam for sending no broadcast message in each time window;

sending the broadcast message group in each time window by using the broadcast beam group; and shutting down, in each time window, the broadcast beam for sending no broadcast message.

10. The communication apparatus according to claim 9, wherein the broadcast message comprises at least one of a synchronization signal block, a system information block type 1 (SIB1) message, other system information (OSI), or a paging message.

11. A communication apparatus comprising:

a processor; and a memory coupled to the processor, wherein the memory comprises instructions that, when executed by the processor, the apparatus is configured to perform operations comprising:

obtaining cell information;

when the cell information meets a preset low-load condition, dividing, based on the cell information, to-be-processed broadcast messages into a plurality of broadcast message groups, wherein the to-be-processed broadcast messages are all broadcast messages to be sent in a time window, each broadcast message group corresponds to one time window, and a length of each time window is equal to a synchronization signal sending periodicity; wherein the cell information comprises downlink resource utilization and a quantity of access users; wherein the cell information compromises downlink resource utilization and a quantity of access users;

when the downlink resource utilization is less than a first preset threshold and the quantity of access users is less than a first preset user quantity, determining that the cell information meets the preset low-load condition;

when the downlink resource utilization falls within a first downlink resource utilization range and the quantity of access users falls within a first user quantity range, dividing the to-be-processed broadcast messages into a fifth quantity of broadcast message groups, wherein the first downlink resource utilization range is a range that is less than the first preset threshold and not less than a second preset threshold, and the first user quantity range is a range that is less than the first preset user quantity and not less than a second preset user quantity; and when the downlink resource utilization falls within a second downlink resource utilization range and the quantity of access users falls within a second user quantity range, dividing the to-be-processed broadcast messages into a sixth quantity of broadcast message groups, wherein the second downlink resource utilization range is a range that is less than the second preset threshold, the second user quantity range is a range that is less than the second preset user quantity, both the fifth quantity and the sixth quantity are positive integers greater than 1, the fifth quantity is less than the sixth quantity, and the sixth quantity is less than or equal to a total quantity of broadcast beams configured for a cell;

determining, based on a preset correspondence between a broadcast message and a broadcast beam, a broadcast beam group corresponding to each broadcast message group and a broadcast beam for sending no broadcast message in each time window;

sending the broadcast message group in each time window by using the broadcast beam group; and shutting down, in each time window, the broadcast beam for sending no broadcast message.

12. The communication apparatus according to claim 11, wherein the broadcast message comprises at least one of a synchronization signal block, a system information block type 1 (SIB1) message, other system information (OSI), or a paging message.

* * * * *